United States Patent [19]
Noguchi et al.

[11] Patent Number: 5,640,597
[45] Date of Patent: Jun. 17, 1997

[54] METHOD AND APPARATUS FOR SERVICING SIMULTANEOUSLY A PLURALITY OF REQUESTS FOR DATA STREAMS

[75] Inventors: Yasuo Noguchi; Naoki Akaboshi, both of Kawasaki, Japan

[73] Assignee: Fujitsu Limited, Kawasaki, Japan

[21] Appl. No.: 520,299

[22] Filed: Aug. 28, 1995

[30] Foreign Application Priority Data

Nov. 17, 1994 [JP] Japan .................. 6-283081

[51] Int. Cl.⁶ .................. G06F 13/00; G06F 13/14
[52] U.S. Cl. .................. 395/841; 395/200.01; 364/16.1; 364/232.22; 364/931.11; 364/942.79
[58] Field of Search .................. 370/79–84, 99, 370/200.01; 395/200.13, 200.17, 250, 840–841, 849, 856, 872, 800; 348/6–7

[56] References Cited

U.S. PATENT DOCUMENTS

| | | | |
|---|---|---|---|
| 5,249,292 | 9/1993 | Chappa | 395/650 |
| 5,339,413 | 8/1994 | Kouaz et al. | 395/650 |
| 5,442,747 | 8/1995 | Chan et al. | 395/164 |
| 5,497,187 | 3/1996 | Banker et al. | 348/6 |
| 5,510,905 | 4/1996 | Birk | 358/342 |

FOREIGN PATENT DOCUMENTS 4-3119  1/1992  Japan .

Primary Examiner—Lance Leonard Barry
Attorney, Agent, or Firm—Armstrong, Westerman, Hattori, McLeland & Naughton

[57] ABSTRACT

A plurality of unit streams which can be simultaneously supplied at a reference speed are determined and a schedule forming section previously forms a schedule for allocating time-dependent uses of a memory unit, an input/output unit, and a buffer memory to all of unit streams. When a stream is actually requested, un-used unit streams of the necessary number are allocated in accordance with a request speed by a stream allocating section. The request stream is supplied in accordance with the schedule of the allocated unit streams.

48 Claims, 25 Drawing Sheets

FIG. 4

| PHASE P | 0 | 1 | 2 | 3 | 4 | 5 | 6 | 7 | 8 |
|---|---|---|---|---|---|---|---|---|---|
| UNIT BUFFER B0 | DR1 | AW1 | AW2 | AW3 | AW4 | | | | |
| UNIT BUFFER B1 | | | | | DR2 | AW5 | AW6 | AW7 | AW8 |

FIG. 5

| PHASE P | 0 | 1 | 2 | 3 | 4 | 5 | 6 | 7 | 8 |
|---|---|---|---|---|---|---|---|---|---|
| UNIT BUFFER B0 | AR1 | AR2 | AR3 | AR4 | DW1 | | | | |
| UNIT BUFFER B1 | | | | | AR5 | AR6 | AR7 | AR8 | DW2 |

FIG. 7A

| PHASE P | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| BUFFER B0 | 0 | 0 | 0 | 0 | 0 | 1 | 1 | 1 | 1 | 1 | 2 | 2 | 2 | 2 | 2 | 3 | 3 | 3 | 3 | 3 |
| B1 | 3 | 3 | 3 | 3 | 0 | 0 | 0 | 0 | 0 | 1 | 1 | 1 | 1 | 1 | 2 | 2 | 2 | 2 | 2 | 3 |
| B2 | 2 | 2 | 2 | 3 | 3 | 3 | 3 | 3 | 0 | 0 | 0 | 0 | 0 | 1 | 1 | 1 | 1 | 1 | 2 | 2 |
| B3 | 1 | 1 | 2 | 2 | 2 | 2 | 2 | 3 | 3 | 3 | 3 | 3 | 0 | 0 | 0 | 0 | 0 | 1 | 1 | 1 |
| B4 | 0 | 1 | 1 | 1 | 1 | 1 | 2 | 2 | 2 | 2 | 2 | 3 | 3 | 3 | 3 | 3 | 0 | 0 | 0 | 0 |

FIG. 7B

| PHASE P | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| st#0 | 4 | 4, 0 | 0 | 0 | 0 | 0, 1 | 1 | 1 | 1 | 1, 2 | 2 | 2 | 2 | 2, 3 | 3 | 3 | 3 | 3, 4 | 4 | 4 |
| st#1 | 3 | 3 | 3, 4 | 4 | 4 | 4 | 4, 0 | 0 | 0 | 0 | 0, 1 | 1 | 1 | 1 | 1, 2 | 2 | 2 | 2 | 2, 3 | 3 |
| st#2 | 2 | 2 | 2 | 2, 3 | 3 | 3 | 3 | 3, 4 | 4 | 4 | 4 | 4, 0 | 0 | 0 | 0 | 0, 1 | 1 | 1 | 1 | 1, 2 |
| st#3 | 0, 1 | 1 | 1 | 1 | 1, 2 | 2 | 2 | 2 | 2, 3 | 3 | 3 | 3 | 3, 4 | 4 | 4 | 4 | 4, 0 | 0 | 0 | 0 |

FIG. 10

| PHASE P | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| BUFFER B0 | 0 | 0 | 0 | 0 | 0 | 1 | 1 | 1 | 1 | 1 | | | | | | | | | | |
| B1 | | | | | 0 | 0 | 0 | 0 | 0 | 1 | 1 | 1 | 1 | 1 | | | | | | |
| B2 | | | | | | | | | 0 | 0 | 0 | 0 | 0 | 1 | 1 | 1 | 1 | 1 | | |
| B3 | 1 | 1 | | | | | | | | | | | 0 | 0 | 0 | 0 | 0 | 1 | 1 | 1 |
| B4 | 0 | 1 | 1 | 1 | 1 | 1 | | | | | | | | | | | 0 | 0 | 0 | 0 |

FIG. 12

| PHASE P | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| BUFFER B0 | 0 | 0 | 0 |   |   |   |   |   |   |   |   |   |   |   |   |   |   |   |   |   |
| B1 |   |   |   |   | 0 | 1 | 0 | 1 | 1 |   |   |   |   |   |   |   |   |   |   |   |
| B2 |   |   |   |   |   | 0 |   |   | 0 | 1 | 0 | 1 | 1 |   |   |   |   |   |   |   |
| B3 | 1 |   |   |   |   |   |   |   |   | 0 |   |   | 0 | 1 | 0 | 1 | 1 |   |   |   |
| B4 |   | 1 |   | 1 | 1 |   |   |   |   |   |   |   |   | 0 | 0 | 0 | 0 | 0 | 0 | 1 |

FIG. 14

| PHASE P | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| BUFFER B0 | 0 | 0 | 0 | | | 1 | 1 | 1 | | | | | | | | | | | | |
| B1 | | | | | 0 | 0 | 0 | | 0 | 1 | 2 | 2 | 2 | | 2 | 2 | 2 | | | |
| B2 | 2 | | | | | | | | | 0 | 1 | 1 | | 1 | 1 | 1 | | | 2 | 2 |
| B3 | | | 2 | 2 | 2 | | | | | | 0 | | 0 | 0 | 0 | 0 | 0 | 1 | 1 | 1 |
| B4 | | 1 | 1 | 1 | | | | | | | | | | | | | 0 | 0 | 0 | |

FIG. 16

| PHASE P | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| BUFFER B0 | 0 | 0 |   |   |   | 1 | 1 |   |   |   | 2 | 2 |   |   |   | 3 | 3 |   |   |   |
| B1 | 3 |   |   |   | 0 | 0 |   |   |   | 1 | 1 |   |   | 1 | 2 | 2 |   |   |   | 3 |
| B2 |   |   |   | 3 | 3 |   |   | 3 | 3 | 0 |   |   | 0 | 0 | 1 |   |   |   | 2 | 2 |
| B3 |   |   | 2 | 2 |   |   | 2 | 2 |   |   |   | 3 | 3 |   |   |   |   | 1 | 1 |   |
| B4 |   | 1 | 1 |   |   |   |   |   |   |   |   |   |   |   |   |   | 0 | 0 |   |   |

FIG. 19

| REQUEST STREAM | SPEED RATIO |
|---|---|
| #A | 2 |
| #B | 1 |
| #C | 1 |

FIG. 20A

| UNIT STREAM | REQUEST STREAM |
|---|---|
| #0 | #A |
| #1 | #A |
| #2 | #B |
| #3 | #C |

FIG. 20B

| UNIT STREAM | REQUEST STREAM |
|---|---|
| #0 | NULL |
| #1 | NULL |
| #2 | #B |
| #3 | #C |

FIG. 20C

| UNIT STREAM | REQUEST STREAM |
|---|---|
| #0 | #B |
| #1 | NULL |
| #2 | NULL |
| #3 | #C |

FIG. 20D

| UNIT STREAM | REQUEST STREAM |
|---|---|
| #0 | #B |
| #1 | #C |
| #2 | NULL |
| #3 | NULL |

| UNIT STREAM | REQUEST STREAM |
|---|---|
| #0 | #B |
| #1 | NULL |
| #2 | #CL |
| #3 | NULL |

| UNIT STREAM | REQUEST STREAM | ACCESS AREA |
|---|---|---|
| #0 | NULL | |
| #1 | NULL | |
| #2 | B | OFFSET $X \sim (X+\Delta X)$ |

| UNIT STREAM | REQUEST STREAM | ACCESS AREA |
|---|---|---|
| #0 | B | OFFSET $X+\Delta X - ((j2-j1)/N)\Delta X$ $\sim X+2\Delta X - ((j2-j1)/N)\Delta X$ |
| #1 | NULL | |
| #2 | B | OFFSET $(X+\Delta X) \sim (X+2\Delta X)$ |

| UNIT STREAM | REQUEST STREAM | ACCESS AREA |
|---|---|---|
| #0 | B | OFFSET $X+\Delta X-((j2-j1)/N)\Delta X$ $\sim X+2\Delta X-((j2-j1)/N)\Delta X$ |
| #1 | NULL | |
| #2 | B | OFFSET $X \sim (X+\Delta X)$ |

METHOD AND APPARATUS FOR SERVICING SIMULTANEOUSLY A PLURALITY OF REQUESTS FOR DATA STREAMS

BACKGROUND OF THE INVENTION

The invention relates to apparatus and method for storing a data stream of moving images and voices into a memory device such as a magnetic disk unit or the like and for supplying the stream in accordance with a request from the outside and, more particularly, to apparatus and method for efficiently processing an input/output request of a data stream of different speeds designated.

Hitherto, as stream processing systems for continuously supplying a large amount of data as a data stream, for example, there are a video on-demand system, a multimedia data base, a desk-top presentation system, and the like. Such a stream processing system is ordinarily constructed by an input/output device for communicating with the outside, a memory device such as a magnetic disk device or the like, and further a buffer memory. In the video on-demand system or the like, since a data stream of moving images and voices is supplied and the user requests various speeds of the stream, it is important to accept a plurality of stream requests of different speeds and to efficiently process them. Even in case of handling only a text such as relational data base, in the case where a large amount of data such as a decision support data base is read and processed and the result is written out, pipeline-like processes are effective. In this case, if a supplying speed of the stream to the outside can be designated in accordance with the processing contents, a buffer memory can be effectively used.

In the conventional system, when there is a request for streams of different speeds, a time-dependent schedule regarding the uses of a memory device, a buffer memory, and an input/output device is formed from a list of un-used resources. The stream is supplied in accordance with the schedule formed. However, such a conventional stream processing system has the following problems. First, when a schedule is formed every request, it takes a time for scheduling, resulting in a decrease in response speed. In case of forming a schedule every request, a vain resource occurs in the resources, and there is a possibility of a decrease in number of streams which can be simultaneously supplied. Further, whether the apparatus can meet a new request or not cannot be known unless a schedule is formed. Therefore, a time until a busy is responded to a request which cannot be satisfied becomes long.

SUMMARY OF THE INVENTION

According to the invention, there are provided apparatus and method of a high performance in which input/output requests of data streams of different speeds can be efficiently processed without needing a long time and a vain consumption of resources can be suppressed and, further, a busy can be also rapidly responded. In the following explanation, "data stream" is simply referred to as a "stream".

An apparatus of the invention has an external input/output (I/O) unit, a memory unit, and a buffer memory. The external I/O unit accepts a plurality of input/output requests from the outside and executes the transmission and reception of the requested streams in parallel at a predetermined reference speed or a speed that is a predetermined times as high as the reference speed. The memory unit stores the streams and executes the reading or writing operation of the streams on a block unit basis of a predetermined data length at a high accessing speed that is (N) times as high as the reference speed. The buffer memory is provided between the external I/O unit and the memory unit and temporarily stores the streams on an access block unit basis.

In addition to the above component elements, the invention also has a schedule forming unit and a stream allocating unit. The schedule forming unit decides a plurality of unit streams which can be simultaneously supplied at the reference speed and forms a schedule table in which a schedule for allocating time-dependent uses of the memory unit, I/O unit, and buffer memory to all of the unit streams has been stored. When an input/output of the streams is requested, the stream allocating unit allocates a necessary number of un-used unit streams in accordance with a request speed and supplies the request stream in accordance with the schedule table of the unit streams allocated. The schedule forming unit forms a schedule regarding the unit streams of the number (N) which is determined by a speed ratio obtained by dividing the accessing speed by the reference speed. For example, assuming that the reference speed is equal to 1 MB/sec and the accessing speed of the memory unit is equal to 4 MB/sec that is four times as high as the reference speed, since the speed ratio is equal to (N=4), four unit streams are defined and a schedule of each unit stream is formed. In the buffer memory, a buffer area is divided into (N+1) unit buffers $Bi$ (i=0 to N) of the number in which "1" is added to the number (N) of unit streams. Each unit buffer corresponds to an area of one block which is transferred by the access of one time of the memory unit.

In the case where a repetitive period (T) which is defined by a period N(N+1) is divided into phases (p)=0 to (T−1) and a unit buffer number is set to (i) and the unit stream number is set to (j), the schedule forming unit forms an allocation schedule of the unit buffers in accordance with the following equation. First, in case of setting the phases (p) and the unit buffer number (i) to parameters, the stream number (j) is obtained from $$j=\{(p+i)\,div\,(N+1)-i\}\,mod\,N$$

and the schedule is formed. In the above expression, "A div B" indicates an integer portion of the quotient by a division A/B. "A mod B" indicates a remainder by A/B. When the remainder is negative, it is set to a value added with (B).

In case of setting the phases (p) and the unit stream number (j) to parameters, the unit buffer number (i) is obtained from the following cases [1 and 2] and the schedule is formed.

[Case 1]

When the phases (p) are set to "(p−j) mod N"=0, namely, when (p−j) can be divided by (N), unit buffers $Bi1$ and $Bi2$ of two buffer numbers $i1$ and $i2$ obtained by $$i1=\{(p-j)\,div\,N-j\}\,mod(N+1)$$

$$i2=(i1-1)\,mod(N+1)$$

are allocated to the unit stream of the stream number (j).

[Case 2]

When the phases (p) are set to "(p−j) mod N" ≠0, namely, when (p−j) cannot be divided by (N), the unit buffer $Bi1$ of the buffer number $i1$ obtained by $$i1=\{(p-j)\,div\,N-j\}\,mod(N+1)$$

is allocated to the unit stream of the stream number (j) and the schedule is formed.

When there is an input/output request of the stream of which the request speed is designated, the stream allocating unit allocates the necessary number of unused unit streams to the request stream in accordance with the request speed. In this case, the request speed of the stream from the outside lies within a range from the reference speed to its N-times speed. The stream allocating unit allocates the un-used unit streams of the number which coincides with a speed ratio (K=1 to N) obtained by dividing the designated speed by the reference speed to the request stream. When the speed ratio (K) includes a decimal, the unused unit streams of the number which coincides with the speed ratio as an integer obtained by raising the decimal to a unit are allocated to the request stream. For example, when the speed ratio (K=1.5), two unit streams are allocated.

When the request stream is an output stream, the stream allocating unit switches the unit buffers of the request stream every (N+1) phases in accordance with the schedule table, reads out the streams of one block from the memory unit at the head phase after completion of the buffer switching operation, stores the read-out streams into the unit buffer, reads out the streams from the unit buffer for a period of time of the remaining (N) phases, and transmits the read-out streams to the outside. For example, in the case where the request speed of the output stream is the reference speed, the streams of one block are read out from the memory unit at the head phase after the buffer switching and stored into the unit buffer. Subsequently, the streams are sequentially read out on a (1/N) block unit basis from the unit buffer at each of the (N) phases and are transmitted to the outside. When the request speed of the output stream is higher than the reference speed, the streams of one block are read out from the memory unit and stored into the unit buffer at the head phase after completion of the buffer switching operation according to the schedule of the unit streams of the number allocated in accordance with the speed ratio (K). The streams are sequentially read out from the unit buffer on a (K/N) block unit basis at each of the next (N/K) phases and are transmitted to the outside. For example, when (N=4) and the request speed is two times as high as the reference speed (K=2), the allocated unit buffers are divided to (N+1=5) phases and used. At the first phase, the request stream of one block is read out from the memory unit and stored into the unit buffer. The request stream is read out from the unit buffer at the next two phases and are transmitted to the outside at the double speed (on a ½ block unit basis) of the reference speed.

On the other hand, when the request stream is an input stream, the streams received from the outside are stored into the unit buffer for a period of time of (N) phases after completion of the buffer switching operation. At the final phase, the streams of one block are read out from the unit buffer and written into the memory unit. For example, when the request speed of the input streams is the reference speed, the streams received on a (1/N) block unit basis from the outside at each of the (N) phases after the buffer switching are sequentially stored into the unit buffer. At the final phase, the streams of one block are read out from the unit buffer and written into the memory unit. When the request speed of the input stream is larger than the reference speed, the streams received on a (K/N) block unit basis from the outside are sequentially stored into the unit buffer at each of the (N/K) phases after completion of the switching of the buffer according to the schedule of the unit streams of the number allocated in accordance with the speed ratio (K). At the final phase, the streams of one block are read out from the unit buffer and written into the memory unit. When the supply of the request stream is finished, the stream allocating unit collects the allocated unit streams and sets to vacant streams.

When receiving a request of the streams from the outside, the stream allocating unit allocates the unit stream of the smallest stream number (j) among the unused unit streams. Further, when the unit streams are collected, in the case where the vacant streams of numbers smaller than the stream number of the unit stream that is being allocated occur, a garbage collecting process for changing the unit stream that is being allocated to the vacant unit stream of the small number is executed.

The invention further provides a processing method of the streams. The processing method has the following features.

I. A plurality of unit streams which can be simultaneously supplied at the reference speed are determined and a schedule for allocating the time-dependent uses of the memory unit, I/O unit, and buffer memory to all of the unit streams is formed.

II. When the streams are requested, the necessary number of un-used unit streams are allocated in accordance with the request speed. The request stream is supplied in accordance with the schedule of the allocated unit streams.

The details of each process in the above method are fundamentally the same as the foregoing apparatus construction.

According to the stream processing apparatus and method of the invention as mentioned above, a plurality of unit streams at the reference speed are decided and the schedule for allocating the memory unit, I/O unit, and buffer memory of the system to all of the unit streams which can be simultaneously supplied is preliminarily formed. When there is actually an input/output of the streams, the necessary number of un-used unit streams are allocated in accordance with the request speed. The streams are supplied by the schedule of the allocated unit streams. When the streams are finished, the unit streams are collected. Therefore, since the schedule which has been prepared is used, it doesn't take a time for scheduling of every request. On the other hand, since the scheduling is previously executed for all of the unit streams, the resources are not consumed in vain and the maximum number of unit streams can be supplied. Further, the maximum number of unit streams which can be supplied by one system and the number of unit streams which are at present being supplied can be easily managed. Even when there is a request exceeding the limit of the system, the system can immediately respond a busy. Since the vacant states of the unit streams can be easily managed from the outside, it is possible to prevent that a request such as to cause a busy waiting state is generated from the beginning.

The above and other objects, features, and advantages of the present invention will become more apparent from the following detailed description with reference to the drawings.

BRIEF DESCRIPTION OF THE DRAWINGS

FIG. 4 is an explanatory diagram for a disk reading process and a buffer allocating process of output streams;

FIG. 5 is an explanatory diagram of a buffer allocating process and a disk writing process of input streams;

FIGS. 7A and 7B are explanatory diagrams of schedule tables;

FIG. 10 is an explanatory diagram of a schedule table corresponding to FIG. 9;

FIG. 12 is an explanatory diagram for a schedule table corresponding to FIG. 11;

FIG. 14 is an explanatory diagram for a schedule table corresponding to FIG. 13;

FIG. 16 is an explanatory diagram for a schedule table corresponding to FIG. 15;

FIG. 19 is an explanatory diagram for a table of request streams and a speed ratio of the request speed;

FIG. 20A to 20D are explanatory diagrams for tables of an allocation, an end, and a collection of unit streams and a garbage collection;

DETAILED DESCRIPTION OF THE PREFERRED EMBODIMENTS

[Operation environment]

Figure 1:
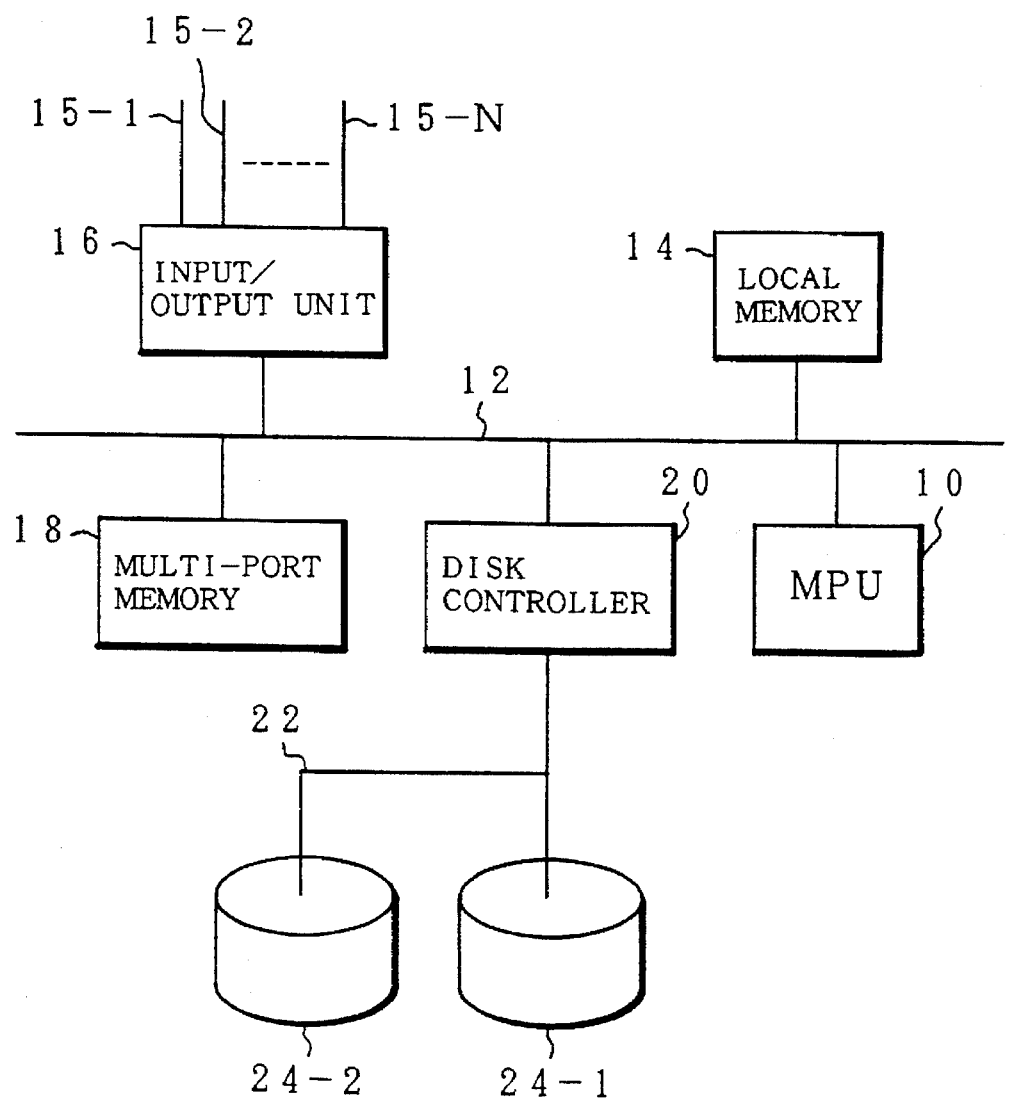
FIG. 1 is a block diagram of an operation environment of the invention.

FIG. 1 shows a hardware construction serving as an operation environment to which a stream processing apparatus and its method of the invention are applied. According to the stream processing apparatus of the invention, a local memory 14 is connected to a system bus 12 of an MPU 10, and an input/output (I/O) unit 16 having a plurality of external interfaces 15-1 to 15-N is provided as an external input/output unit. A multi-port memory 18 which is used as a buffer memory is connected to the system bus 12. Further, a disk controller 20 is connected to the system bus 12. Under domination of the disk controller 20, magnetic disk drive units 24-1 and 24-2 are connected through a disk bus 22. A memory unit in the stream processing apparatus of the invention is constructed by the disk controller 20 and magnetic disk drive units 24-1 and 24-2. An accessing speed (transfer speed) at which the disk controller 20 reads or writes data from/to the magnetic disk drive units 24-1 and 24-2 is, for example, set to 4 MB/sec. On the other hand, a transfer speed at which data is transmitted or received to/from the I/O unit 16 by the external interfaces 15-1 to 15-N is set to a speed which is equal to or lower than the accessing speed 4 MB/sec on the magnetic disk side. For example, the transfer speed of the external interfaces 15-1 to 15-N is set to either one of 1 MB/sec, 2 MB/sec, 3 MB/sec, and 4 MB/sec. Such a transfer speed can be also set to a value having a decimal, for example, 1.5 MB/sec so long as it lies within a range of 0 to 4 MB/sec. The multi-port memory 18 which is used as a buffer memory is a memory which has ports corresponding to the external interfaces 15-1 to 15-N for the I/O unit 16 and can simultaneously execute a plurality of reading or writing operations by using (N) ports.

Figure 2:
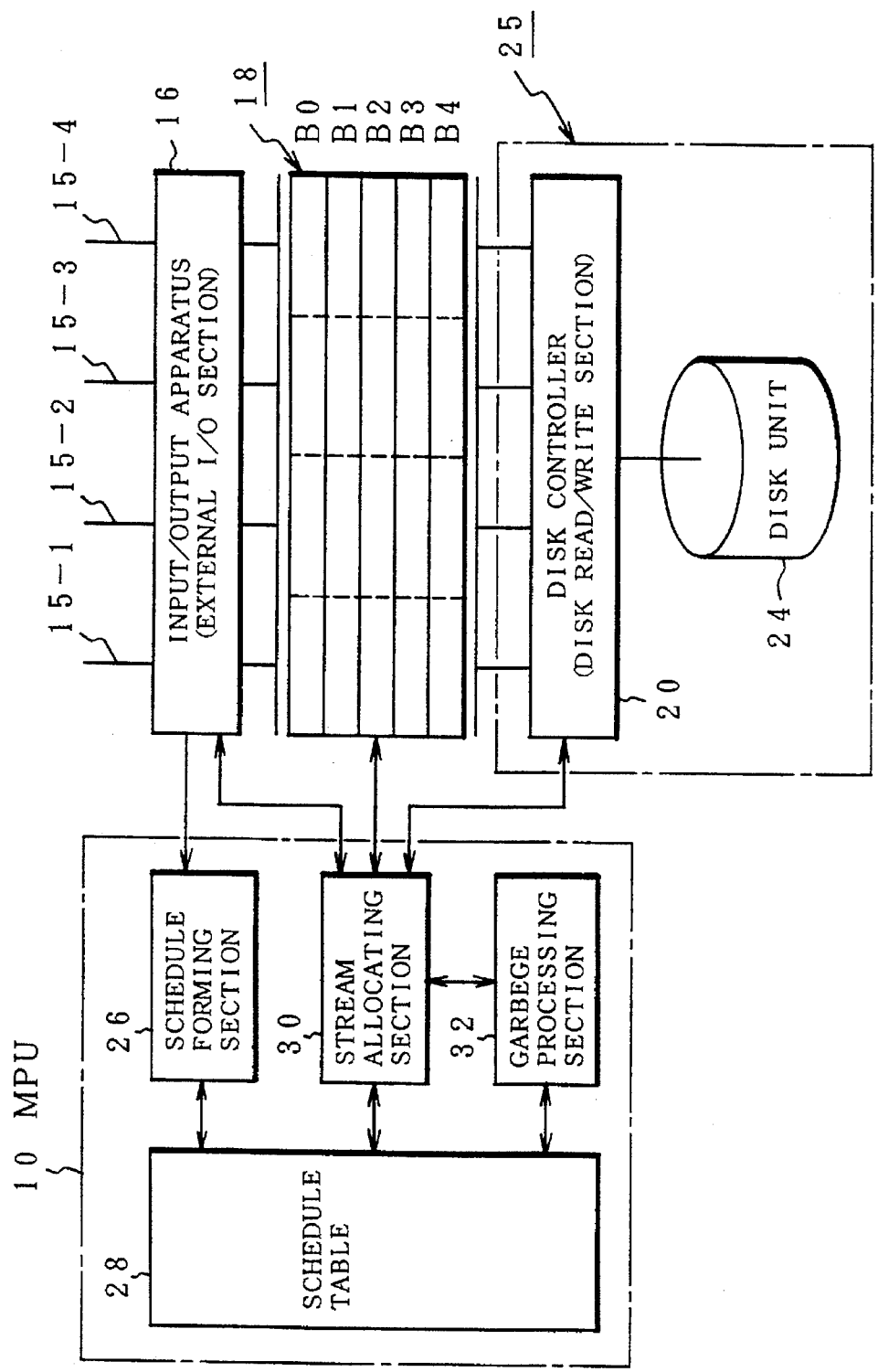
FIG. 2 is a block diagram of functions of the invention.

FIG. 2 is a functional block diagram of a stream processing apparatus of the invention which is realized by the MPU 10 in the operation environment of FIG. 1. Four external interfaces 15-1 to 15-4 are provided between the I/O unit 16 and the outside. The disk controller 20 and disk unit 24 construct a memory unit 25. The buffer memory 18 is provided between the memory unit 25 and the I/O unit 16. First, in a stream process of the invention, a reference speed which is used for transmission or reception of the stream is determined. The reference speed is decided by the accessing speed for the magnetic disk drive unit 24 and the number of transmission/reception channels which are simultaneously executed between the I/O unit 16 and the outside. For instance, assuming that the transfer speed of the magnetic disk unit 24 is equal to 4 MB/sec, since the number of channels of the I/O unit 16 is equal to four, the speed 1 MB/sec which is ¼ of the accessing speed is set to the reference speed. The buffer memory 18 is divided into unit buffer areas B0 to B4 which can be simultaneously accessed. As the number of unit buffers of the buffer memory 18, now assuming that the value obtained by dividing the disk accessing speed by the reference speed is equal to (N), (N+1) unit buffers are provided. In the embodiment, since the value (N) obtained by dividing the accessing speed by the reference speed is equal to 4 (N=4), the number of unit buffers is set to (N+1)=5. Those unit buffers are represented by B0 to B4 by an ID as shown in the diagram. In this example, reference numerals 0 to 4 indicate buffer numbers and "i" is generally used. Namely, the unit buffer is expressed by Bi.

The MPU 10 has a schedule forming section 26, a schedule table 28, a stream allocating section 30, and a garbage processing section 32 by a program control. The schedule forming section 26 determines a plurality of unit streams which can be simultaneously supplied at the reference speed. In the embodiment, the number of unit streams which can be simultaneously supplied at the reference speed is equal to (N=4). Further, the schedule forming section 26 forms a schedule to allocate time-dependent uses of the memory unit 25, input/output unit 16, and buffer memory 18 to all of the unit streams and stores into the schedule table 28. When there are actually input/output requests of streams from the outside to the I/O unit 16, the stream allocating section 30 allocates the necessary number of un-used unit streams in accordance with a request speed. Subsequently, in accordance with the schedule stored in the schedule table 28 of the allocated unit streams, the request stream is supplied by using the memory unit 25, buffer memory 18, and I/O unit 16, namely, the request stream is inputted to the memory unit 25 or the request stream is outputted from the memory unit 25 to the outside.

Figure 3:
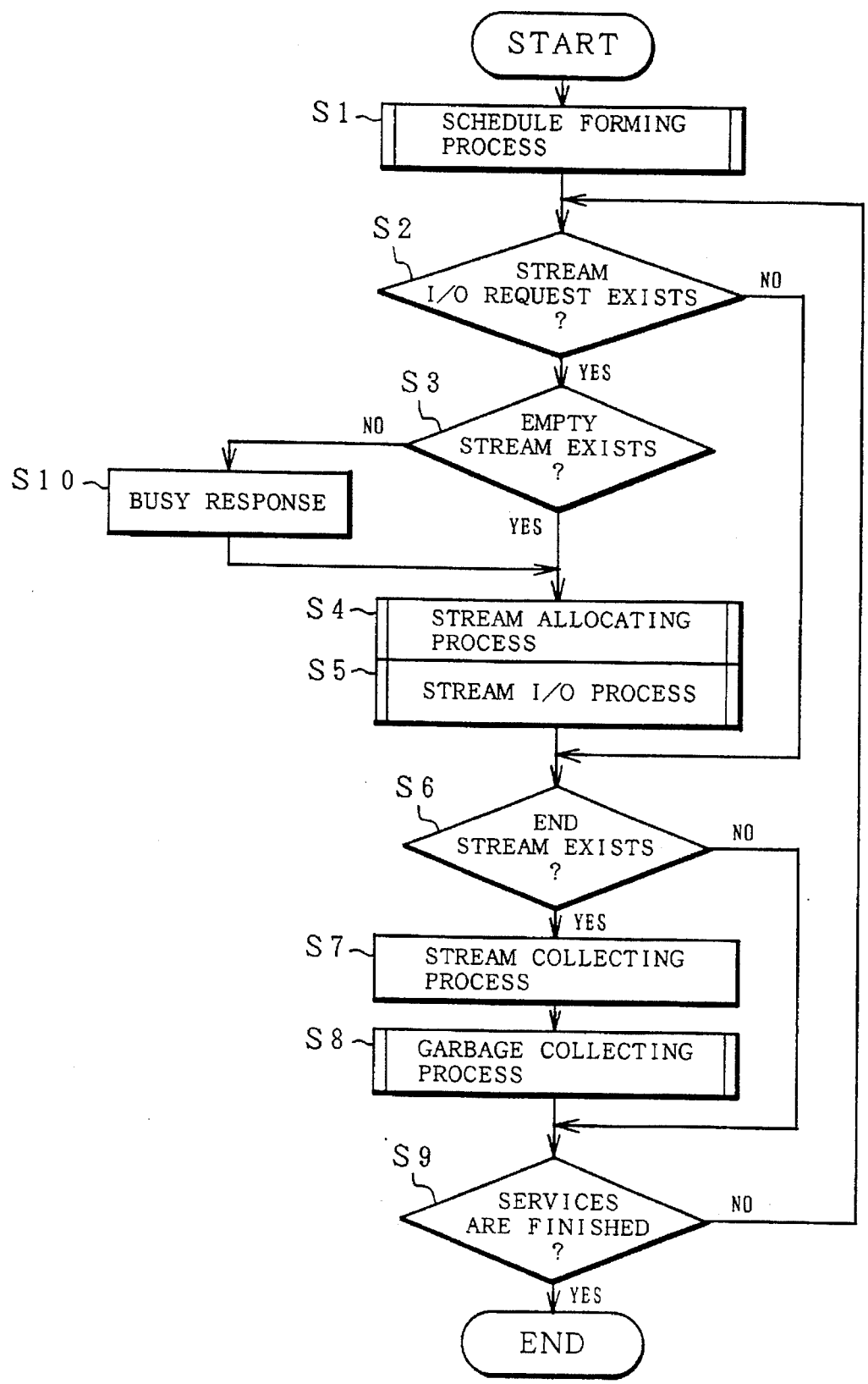
FIG. 3 is a flowchart for whole processes of streams of the invention.

A flowchart of FIG. 3 relates to the overall operation of a stream process of the invention by the MPU 10 in FIG. 2. When the apparatus is activated, a schedule forming process is first executed in step S1. The schedule forming process will be clearly explained hereinlater. After the schedule was formed, a check is made to see if there is an input/output request of the stream from the outside or not in step S2. If YES, step S3 follows and the presence or absence of un-used unit streams is discriminated. When there is no un-used unit stream, a busy response is returned in step S9. When there are un-used vacant streams, step S4 follows and a stream allocating process is executed. In step S5, an input/output process of the streams according to the allocating process is executed. The stream allocating process and stream input/output process will be also clearly explained hereinlater. In subsequent step S6, the presence or absence of the end streams is judged. When there are end streams, a process to collect the unit streams allocated to the streams which were finished is executed in step S7. In step S8, a garbage collecting process is performed. In the garbage collecting process, after the unit streams were collected in step S7, the allocation of the unit stream that is being used is changed to a vacant stream of a small stream number. After completion of the garbage process, a check is made in step S9 to see if the services are finished or not. During the execution of the services, the processing routine is returned to step S2 and the processes corresponding to the next input/output request are executed.

[Forming of schedule of streams]

FIG. 4 shows the allocation of unit buffers of output streams to be transmitted to the outside. First, each capacity of the unit buffers B0 to B4 provided for the buffer memory 18 in FIG. 2 is set to a predetermined data length of one block which can be transferred by the access of one time of the magnetic disk drive unit 24 by the disk controller 20. Therefore, with respect to the output streams of FIG. 4, the streams of one block are read out from the magnetic disk drive unit 24 at a timing of a phase 0 with respect to the request streams and are stored as read data DR1 into the unit buffer B0. Now, assuming that the request speed of the I/O unit 16 is set to the reference speed of ¼, the read data DR1 obtained by the disk access of one time is separately outputted as external outputs AW1 to AW4 of four times as shown at phases 1 to 4. At the phase 4, the last external output AW4 is executed from the unit buffer B0. However, in order to continuously output the data to the outside without interrupting the data streams, the read access of the magnetic disk drive unit 24 is simultaneously performed at the timing of the phase 4 and read data DR2 is stored into the next adjacent unit buffer B1. External outputs AW5 to AW8 in which the unit buffer is switched to the unit buffer B1 are sequentially executed from the phase 5.

FIG. 5 shows the allocation of the input streams to write the streams from the outside to the memory unit 25 on the contrary. FIG. 5 relates to a case where the request speed of the input streams is equal to the reference speed. For the input streams of the reference speed, first, the streams of external inputs AR1 to AR3 of a ¼ block unit are written into the unit buffer B0 by using four phases of the phases 0 to 3. At the phase 4, a disk write DW1 in which the external inputs AR1 to AR3 written in the unit buffer B0 at the phases 0 to 3 are written into the magnetic disk drive unit 24 at the 4-times transfer speed is executed. Since the streams are continuously supplied from the outside at the reference speed, in order to store the input streams into the buffer without an interruption, the unit buffer B1 is simultaneously allocated at the same phase 4 and an external input AR5 is stored. A disk write DW2 in which four external inputs AR5 to AR8 are stored until the phases 5 to 7 after switching the buffer to the unit buffer B1 and the data of one block is written in a lump into the magnetic disk drive unit 24 at the last phase 8 is executed.

Figure 6:
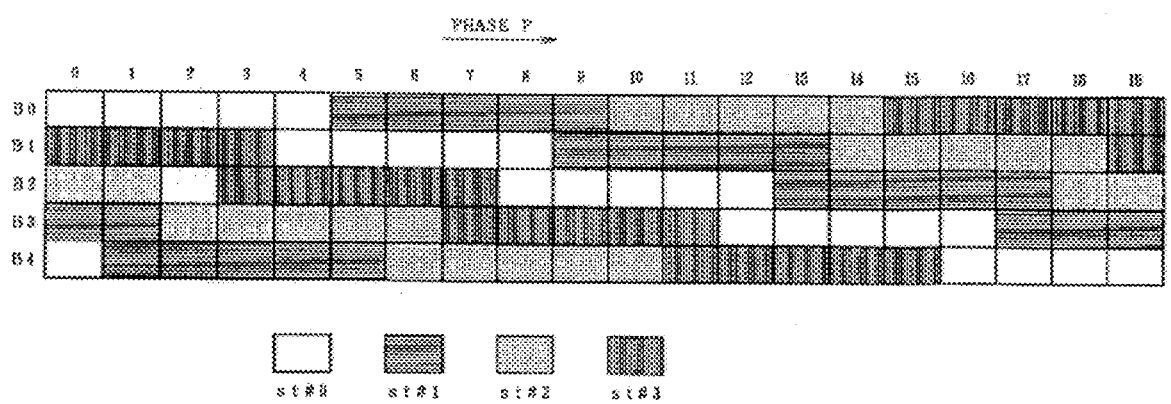
FIG. 6 is an explanatory diagram of a schedule for allocating unit streams for unit buffers and phases when (N=4)

When forming a time schedule regarding such a buffer allocation of four unit streams which can be simultaneously supplied at the reference speed in FIGS. 4 and 5 as mentioned above, the time schedule is as shown in FIG. 6. In FIG. 6, an axis of ordinate indicates five unit buffers B0 to B4 and an axis of abscissa shows phases (p=0 to 19) as a time base. Now, assuming that (N=4), the phases (p) are repeated at N(N+1) times. Such a state is defined at a repetitive period (T) and T=N(N+1)=20. Therefore, the values of the phases (p) can be expressed by 0 to (T−1). Further, since the number of unit streams which can be simultaneously supplied in this embodiment is equal to (N=4), four kinds of unit streams st#0, st#1, st#2, and st#3 shown on the lower side are defined. The unit stream has an abbreviation symbol of "st" and the subsequent #0 to #3 denote the ID numbers of the unit streams. Generally, the numerals 0 to 3 of the ID numbers are expressed by "j". Therefore, the unit stream can be expressed by "st#j". When forming the schedule, four allocation patterns of the unit streams st#0 to st#3 belonging to the unit buffers B0 to B4 with regard to p=0 to 19 which give the repetitive period (T) are formed. First, when seeing the unit stream st#0 of the smallest number, it is allocated to the unit buffer B0 at the phases 0 to 4 and is simultaneously allocated to the lower adjacent unit buffer B1 at the phase 4. In a manner similar to the above, the switching of the unit buffer is allocated every five phases. In the next unit stream st#1, the phases 5 to 9 subsequent to the unit stream st#0 of the head unit buffer B0 are allocated. At the phase 9, the next unit buffer B1 is simultaneously allocated. The above allocating processes are repeated after that. The same shall also similarly apply with respect to the remaining unit streams st#2 and st#3. It will be obviously understood that the phase is returned to the head phase 0 after the phase 19.

FIG. 7A shows the contents in the case where the schedule formed in FIG. 6 was registered into the schedule table 28 by the schedule forming section 26 in FIG. 2. In the schedule table 28, the numbers 0 to 3 of the unit streams st#0 to st#3 serving as targets to be allocated are stored in a memory area designated by two-dimensional addresses of the addresses 0 to 19 which are designated at the phases (p) arranged in the horizontal direction and the addresses which are designated by the unit buffers B0 to B4 arranged in the vertical direction. When there is actually an input/output request, the schedule table 28 is referred by the stream allocating section 30. The uses of the I/O unit 16, buffer memory 18, and memory unit 25 are allocated in accordance with the schedule formed. For example, assuming that the request speed from the outside is equal to the reference speed and the unit stream st#0 is allocated, the schedule table 28 is referred every phases (p=0 to 19) and the output streams or input streams using either one or two of the unit buffers B0 to B4 corresponding to the ID No.=0 of the allocated unit stream st#0 are supplied. FIG. 7A shows table contents to specify the corresponding unit streams by the phases (p=0 to 19) and the unit buffers B0 to B4. However, by changing those table contents, it is also possible to form a table to obtain the buffer numbers 0 to 4 of the allocated unit buffers by each phase and the unit streams st#0 to st#3.

The allocation schedules of the memory unit, input/output unit, and buffer memory of the unit streams in FIGS. 6 and 7A are defined as follows when assuming that the stream numbers (j) of the unit streams st#j are set to (j=0 to N+1) and the buffer numbers (i) of the unit buffers (Bi) are set to (i=0 to N) and the phases (p) are set to (p=0 to T-1). First, an expression to allocate the unit stream (j) to the unit buffer (i) at the unit phase (p) which is determined by a unit time (t) is given as follows.

$$j=\{(p+i)div(N+1)-i\}mod N \quad (1)$$

As a general form, (A div B) denotes the quotient by the division A/B. As a general form, (A mod B) denotes the remainder by the division A/B. When the remainder is negative, it is set to the value added with (B). The unit stream numbers of the phase (p=0) and the unit buffer numbers (i=0 to 4) in FIG. 7A are specifically obtained.

Unit buffer No. $i = 0$
$j = \{(p + i) \text{ div } (N + 1) - i\} \text{ mod } N$
$= \{(0 + 0) \text{ div } 5 - 0\} \text{ mod } 4$
$= \{0 \text{ div } 5 - 0\} \text{ mod } 4$
$= \{0 - 0\} \text{ mod } 4$
$= 0 \text{ mod } 4$
$= 0$ Unit buffer No. $i = 1$
$j = \{(0 + 1) \text{ div } 5 - 1\} \text{ mod } 4$
$= -1 \text{ mod } 4$
$= 3$ Unit buffer No. $i = 2$
$j = \{(0 + 2) \text{ div } 5 - 2\} \text{ mod } 4$
$= -2 \text{ mod } 4$
$= 2$ Unit buffer No. $i = 3$
$j = \{(0 + 3) \text{ div } 5 - 3\} \text{ mod } 4$
$= -3 \text{ mod } 4$
$= 1$ Unit buffer No. $i = 4$
$j = \{(0 + 4) \text{ div } 5 - 4\} \text{ mod } 4$
$= -4 \text{ mod } 4$
$= 0$ At the unit phase (p) which is determined by the unit time (t) in FIG. 7B, an expression to allocate the unit buffer (i) from the unit stream (j) is given as follows.

Case 1: in case of $(p - j) \text{ mod } N = 0$, (2)
$i1 = \{(p - j) \text{ div } N - j\} \text{ mod } (N + 1)$
$i2 = (i1 - 1) \text{ mod } (N + 1)$ Case 2: in case of $(p - j) \text{ mod } N \neq 0$, (3)
$i1 = \{(p - j) \text{ div } N - j\} \text{ mod } (N + 1)$
$i2 = \text{nil}$ When specifically obtaining unit buffers i1 and i2 to be allocated at each of the unit phases (p=0 to 8) of the unit stream (j=0) in FIG. 7B, they are as follows.

Figure 8:
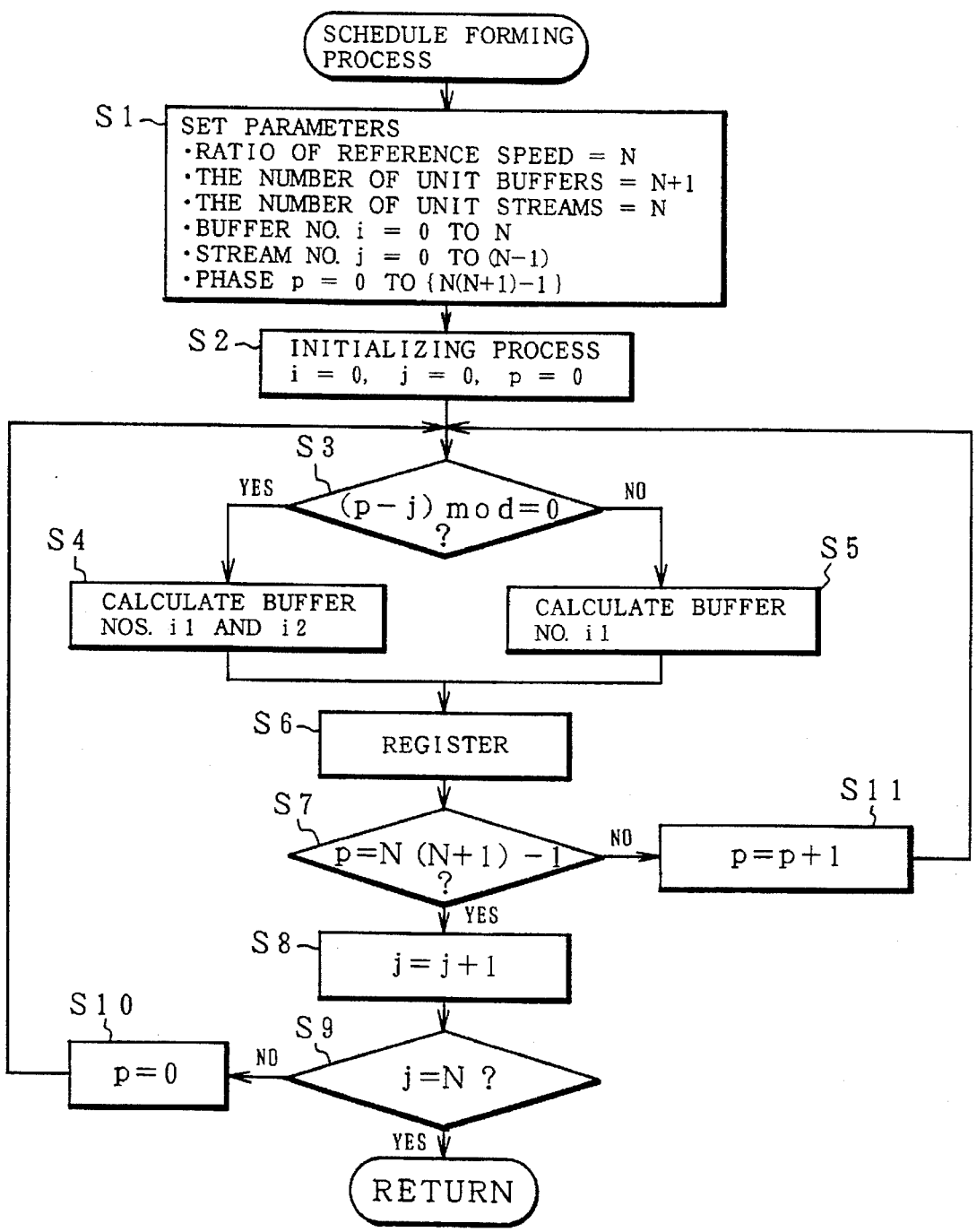
FIG. 8 is a flowchart for schedule forming process.

When $p = 0$,
$i1 = 5 - 0 \text{ mod } 5 = 0$    buffer $B0$
$i2 = (0 - 1) \text{ mod } 5 = 4$    buffer $B4$ When $p = 1$,
$i1 = 1 \text{ div } 4 \text{ mod } 5 = 0$    buffer $B0$ When $p = 2$,
$i1 = 2 \text{ div } 4 \text{ mod } 5 = 0$    buffer $B0$ When $p = 3$,
$i1 = 3 \text{ div } 4 \text{ mod } 5 = 0$    buffer $B0$ When $p = 4$,
$i1 = 1 \text{ mod } 5 = 1$    buffer $B1$
$i2 = (1 - 1) \text{ mod } 5 = 0$    buffer $B0$ When $p = 5$,
$i1 = 1(1 \text{ div } 4) \text{ div } 4 \text{ mod } 5 = 1$    buffer $B1$ When $p = 6$,
$i1 = 1(2 \text{ div } 4) \text{ mod } 5 = 1$    buffer $B1$ When $p = 7$,
$i1 = 1(3 \text{ div } 4) \text{ mod } 5 = 1$    buffer $B1$ When $p = 8$,
$i1 = 2 \text{ mod } 5 = 2$    buffer $B2$
$i2 = (2 - 1) \text{ mod } 5 = 1$    buffer $B1$ A flowchart of FIG. 8 shows a schedule forming process of the invention using the above expressions (2) and (3). First in step S1, parameters are set. As parameters, the number of unit buffers (N+1), the number of unit streams (N), the buffer number (i), the stream number (j), and the phase p=0 to (T-1) are set. In step S2, the buffer number (i), stream number (j), and phase (p) are respectively initialized to "0". In step S3, a check is made to see if (p-j) mod N is equal to 0 or not. It is equal to "0" when (p-j) can be divided by (N). In this case, step S4 follows and the buffer numbers i1 and i2 in the case 1 are calculated in accordance with the expression (2). In step S3, when (p-j) mod N is equal to a value other than "0", namely, when (p-j) cannot be divided by (N), step S5 follows and the buffer number i1 is calculated in accordance with the expression (3) in case 2. After it was calculated, for example, the table of FIG. 7B is registered in step S6. In step S7, a check is made to see if the phase (p) is the final phase (T-1) or not. If NO, the phase is increased by "1" in step S10. The processes in steps S3 to S6 are repeated. When the phase (p) is the final phase (T-1) in step S7, the stream number (j) is increased by "1" in step S8. When the stream number (j) doesn't reach the final stream number (N) in step S9, the phase (p) is initialized to "0" in step S11. After that, the processing routine is returned to step S3 and the table registration by the calculation of the buffer number with respect to the next stream number (j) is executed. When the stream number (j) is equal to the final number (N) in step S9, the series of schedule forming processes are finished.

[Allocation of unit streams]

In the schedule forming section 26 in FIG. 2, when the schedule is formed and registered into the schedule table 28, the allocation of the unit streams and the supply of the streams for the input/output request are executed by the stream allocating section 30. First, as will be obviously understood from the schedule formed in FIG. 6, in case of a speed ratio (K=1) in which the request speed is equal to the reference speed, by sequentially allocating the four unit streams st#0 to st#3 in accordance with this order in response to the request of the output streams and/or input streams, the request stream can be simultaneously outputted and/or inputted.

Figure 9:
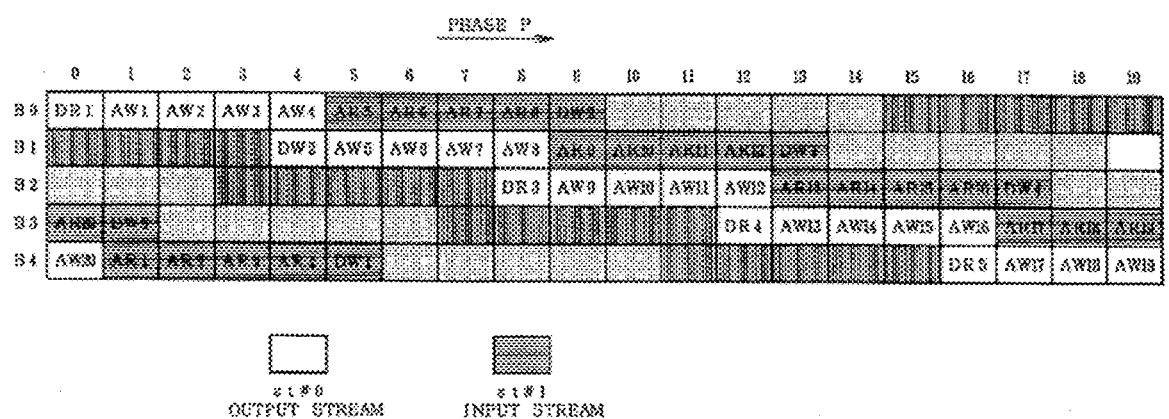
FIG. 9 is an explanatory diagram for allocation of unit streams for each of the output request and input request at a reference speed.

FIG. 9 shows a case where an output request of the streams at the request speed that is equal to the reference speed is accepted and the unit stream st#0 is allocated and, subsequently, the input request of the streams at the request speed that is equal to the reference speed is accepted and the unit streams st are allocated. FIG. 10 shows the effective area of the schedule table 28 at the time of the allocation of the unit streams of one output stream and one input stream in FIG. 9.

Figure 11:
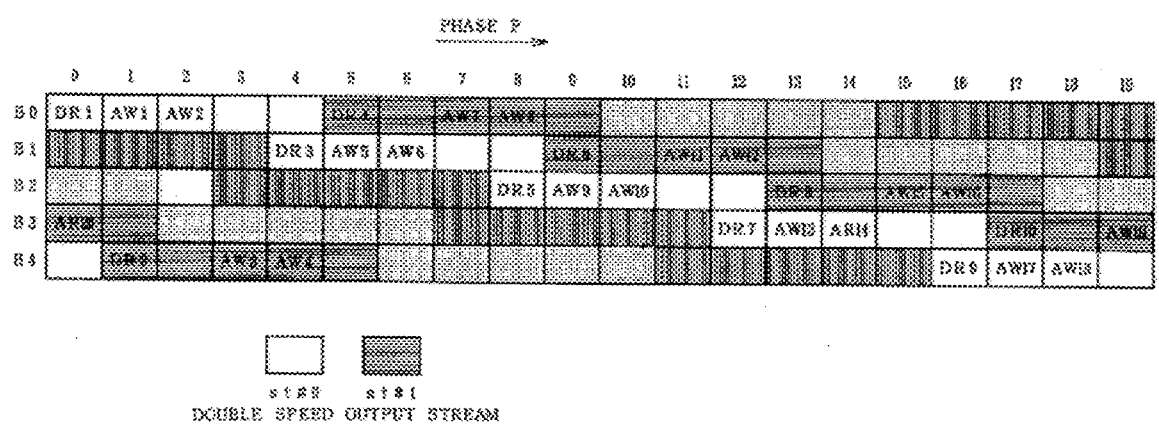
FIG. 11 is an explanatory diagram for allocation of unit reams for an output request at the two-times request speed.

FIG. 11 shows the case where the output streams at the 2-times speed are requested when the speed ratio is set to (K=2) in which the request speed is two times as high as the reference speed. In case of requesting the output streams at the double speed as mentioned above, two unit streams st#0 and st#1 corresponding to the speed ratio (K=2) are allocated to the request stream. Specifically speaking, the unit buffer B0 is allocated at the phase 0 and the streams of a predetermined data length read out from the magnetic disk drive unit 24 are stored as a disk read DR1. At the next phases 1 and 2, the external outputs AW1 and AW2 in which the streams are read out from the unit buffer B0 at the 2-times request speed of the reference speed and supplied to the outside are sent. At the phase 1, the unit buffer B4 is allocated and the disk read DR2 is performed. Since the unit buffer B0 is vacant at the timings of the phases 3 and 4, the external outputs AW3 and AW4 from the unit buffer B4 are executed at those timings. By such an allocation of the unit buffer for every phase, the external outputs AW1 to AW20 can be continuously executed by using two unit streams st#0 and st#1 at the request speed of two times of the reference speed without an interruption. FIG. 12 shows values of the effective area which is used for allocation of the streams of the schedule table 28 in the output streams of the 2-times speed in FIG. 11.

Figure 13:
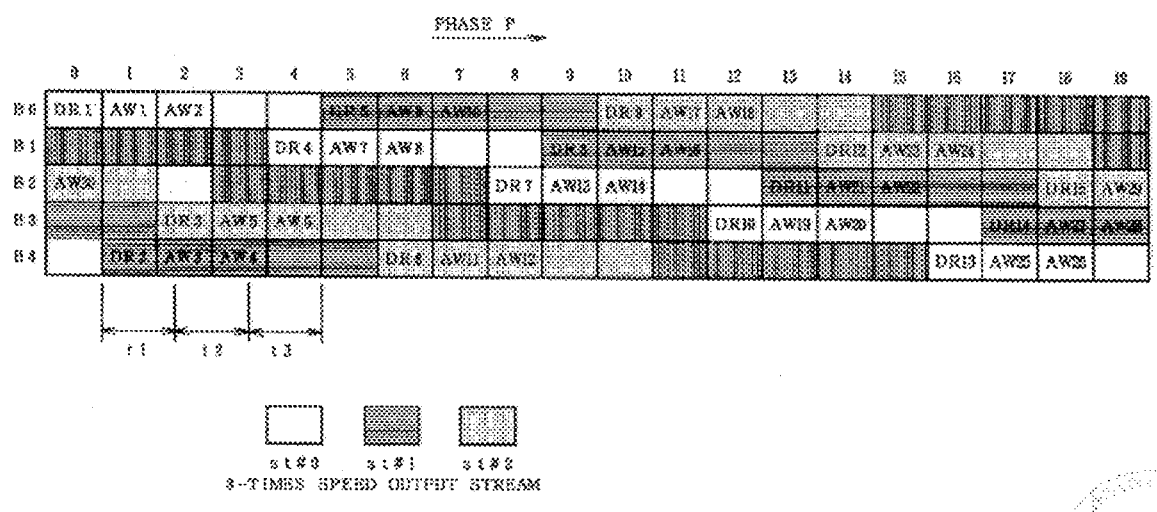
FIG. 13 is an explanatory diagram for allocation of unit streams for an output request at the three-times request speed.

FIG. 13 shows an allocation of the streams in case of the speed ratio (K=3) in which the request speed is three times as high as the reference speed. When the request speed is three times as high as the reference speed, three unit streams st#0, st#1, and st#2 are allocated to one request stream. First, the unit buffer B0 is allocated at the phase 0 and the disk read DR1 is executed. Although the external outputs AW1 and AW2 are performed at the next phases 1 and 2, since the request speed is equal to three times of the reference speed, the external outputs are finished for a time t1 in which the time of ⅓ of the phase 2 is added to the time of the phase 1. On the other hand, the unit buffer B4 is allocated at the timing of the phase 1 and the disk read DR2 at the second time is executed. At the next phase 2, when the external output AW2 in the unit buffer B0 is finished by using the time of ⅓, the streams of the disk read DR2 are executed as external outputs AW3 and AW4 for a time in which the time of ⅔ of the next phase 3 is added to the remaining time of ⅔ of the same phase 2. A disk read DR3 of the third time is executed at the phase 2. Since the external output AW4 from the unit buffer B4 is finished at the next phase 3 for the time of ⅔, the unit buffer is switched to the allocation of the unit buffer B3 at this time point, the next phase 4 is added, and the external outputs AW5 and AW6 of the disk read DR3 are executed. In a manner similar to the above, the external outputs AW1 to AW30 are repeated at the request speed of three times of the reference speed every phases (p=0 to 19). FIG. 14 shows data in an allocation effective area of the schedule table in the 3-times speed streams in FIG. 13.

Figure 15:
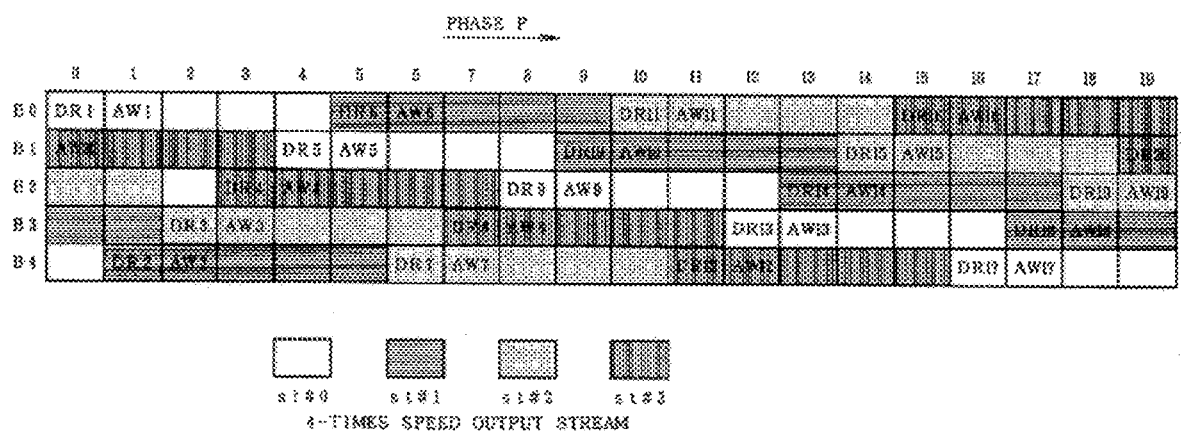
FIG. 15 is an explanatory diagram for allocation of unit streams for an output request at the four-times request speed.

FIG. 15 shows an allocation of the streams in case of the speed ratio (K=4) in which the request speed is equal to four times of the reference speed. When the request speed is four times as high as the reference speed, four unit streams st#0 to st#3 are allocated. In this case, the request speed coincides with the disk accessing speed. Therefore, the unit buffer B0 is allocated at the phase 0 and the first disk read DR1 is executed. At the next phase 1, the external output AW1 is performed. At the same time, the unit buffer B0 is allocated and the disk read DR2 at the second time is executed. The external output AW2 is performed at the next phase 2. In a manner similar to the above, by simultaneously executing the disk read and the external output while allocating two unit buffers at the same phase, the external outputs AW1 to AW20 are repeated at the phases 0 to 19 at the 4-times request speed. FIG. 16 shows values in the effective area of the schedule table which is used in the streams of the 4-times speed in FIG. 15. Although FIGS. 11 to 16 show the allocation of the output streams as an example, a similar construction is also applied to the input streams.

Figure 17:
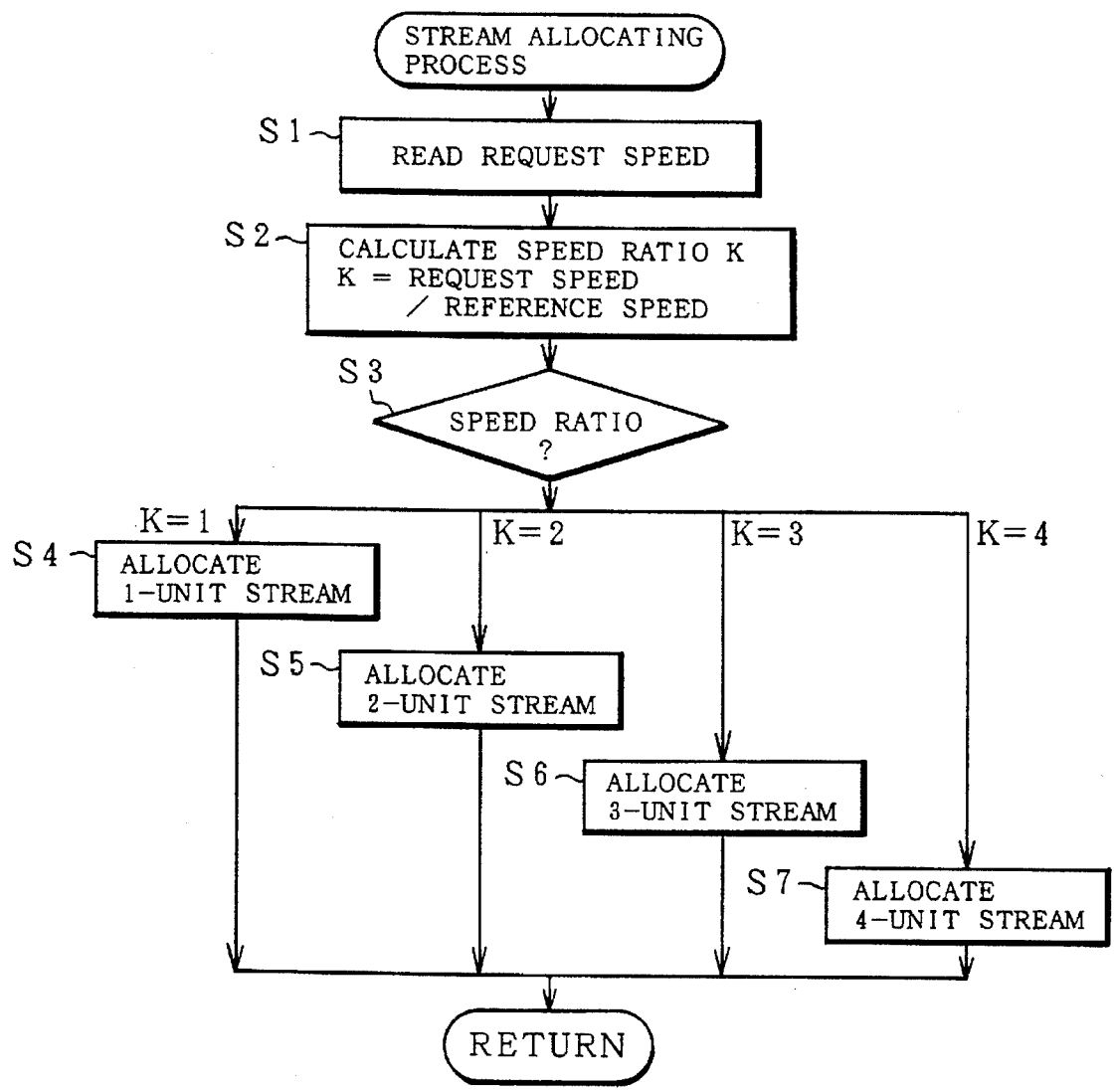
FIG. 17 is a flowchart for a stream allocating process.

A flowchart of FIG. 17 shows a stream allocating process of the invention. First in step S1, the request speed is read. The speed ratio (K) is calculated in step S2. In step S3, the speed ratio (K) is judged. The unit streams of the number corresponding to the speed ratio (K) are allocated and the streams are supplied in steps S4 to S7 with respect to each of the reference speed of (K=1), 2-times speed of (K=2), 3-times speed of (K=3), and 4-times speed of (K=4), respectively.

Figure 18:
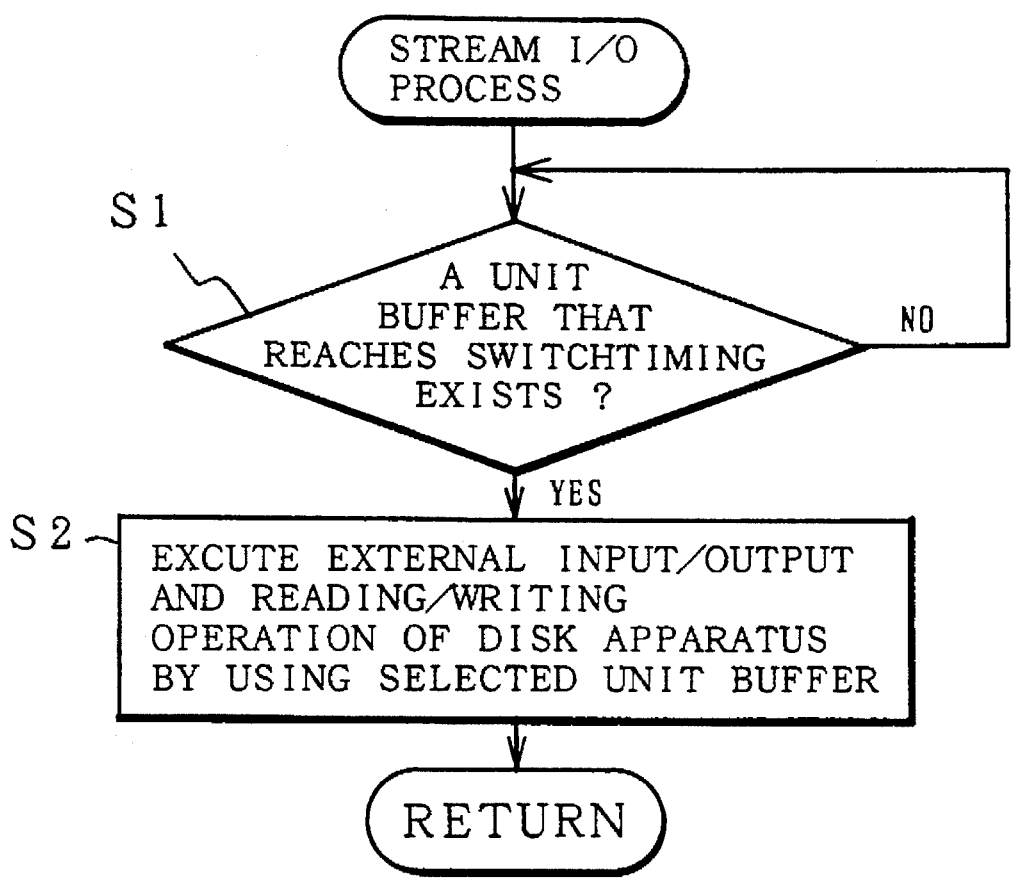
FIG. 18 is a flowchart for a stream input/output process.

FIG. 18 shows stream input/output processes subsequent to the allocation of the stream during services at present. First in step S1, a check is made to see if a switching timing of the unit buffer or not. When reaching the switching timing of the unit buffer, step S2 follows. In step S2, the external input/output of the streams and the reading/writing operation for the disk apparatus side are executed by selected unit buffer. The processing routine is returned to the main routine of FIG. 3.

[Collection of unit streams and garbage collection]

In the flowchart of the main routine of FIG. 3, the stream allocating process is executed in step S4. When the input/output processes of the streams are executed in step S5, a check is made to see if there is a finished stream or not in step S6. If YES, a process for collecting the unit streams and returning to the un-used unit streams is executed in step S7. In step S8, when a number j1 of the unit stream which becomes an un-used stream due to the collection is smaller than a stream number j2 of the unit stream which is at present being used, a process for a garbage collection to change the unit stream in use to the un-used unit stream of the small number is executed. The garbage collecting process will now be specifically explained hereinbelow.

Figure 19:
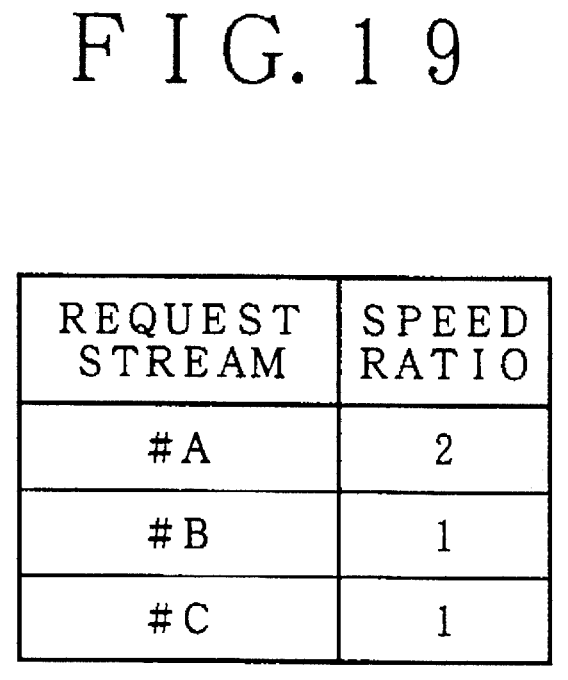

FIG. 19 shows a request stream at a certain time point and the speed ratio of the request speed to the reference speed. It is now assumed that the request speed of a request stream #A is two times as high as the reference speed and the speed ratio is equal to 2. Request speeds of both of request streams #B and #C are equal to the reference speeds and the speed ratio is set to 1. For the request streams #A, #B, and #C having such request speeds, the unit streams of the number according to the request speed are allocated as shown in FIG. 20A. Namely, since the speed ratio of the request stream #A is equal to (K=2), two unit streams st#0 and st#1 are allocated. Since the request speeds of the request streams #B and #C are equal to the reference speed and the speed ratio is equal to (K=1), each of the unit streams st#2 and st#3 is allocated. In the allocating state of the unit streams of FIG. 20A, when the input or output of the request stream #A is finished, the unit streams st#0 and st#1 allocated to the request stream #A are respectively collected and are set to un-used streams (NULL) as shown in FIG. 20B. As mentioned above, when the stream numbers of the unit streams st#0 and st#1 which were set to the un-used streams by the collection are smaller than the stream numbers of the unit streams st#2 and st#3 which are at present being used, the garbage collecting process in step S8 in FIG. 3 is executed. First, the garbage collection is executed with respect to the request stream #B to which the unit stream st#2 is allocated. As shown in FIG. 20C, the unit stream for the request stream #B is changed from st#2 to the head unit stream st#0. As shown in FIG. 20D, subsequently, the process to change the request stream #C to which the unit stream st#3 is allocated to the un-used unit stream st#1 is executed.

Figures 21, 22:
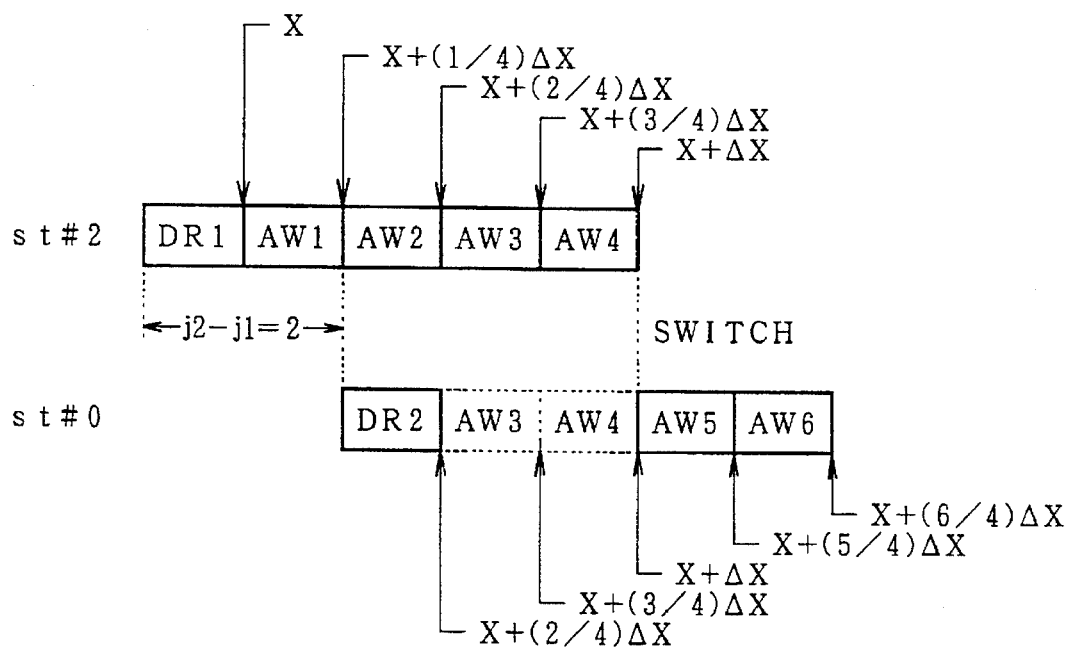
FIG. 21 is an explanatory diagram for a table in which un-used unit streams become discontinuous.
FIG. 22 is an explanatory diagram for switching of output unit streams.

By such a garbage collection, the un-used unit stream is always continuous with the unit stream of a large stream number, so that the un-used unit streams are always collected, thereby making it possible to allocate a plurality of continuous unit streams for a stream input/output request of the request speed exceeding the reference speed. For example, as shown in FIG. 21, in the case where the unit stream st#0 is allocated to the request stream (B) and the unit stream st#2 is allocated to the request stream (C) and the unit streams st#1 and st#3 are un-used, if there is an input/output request of the stream having the request speed of two times as high as the reference speed, two unit streams need to be allocated. In this case, however, since the un-used unit streams st#1 and st#3 are not continuous, two unit streams cannot be allocated. Therefore, by executing the garbage collection to collect the un-used unit streams to the side of the large stream numbers, a plurality of unit streams in the vacant state having the continuous stream numbers can be properly allocated in response to the stream input/output request of the request speed exceeding the reference speed.

An allocation change of the unit streams in the garbage collection will now be described. FIG. 22 shows a change of the unit stream in the output stream. It is now assumed that the unit stream st#2 is allocated to the output stream #B and is switched to the un-used unit stream st#0. As shown in FIG. 6, when switching the unit stream, a fact that each of the unit streams st#0 to st#3 has a repetitive structure of the phase number of (N+1) in each of the unit buffers B0 to B4 is used. For example, now assuming that the unit stream on the switching destination side of the small number is set to st#j1 and the unit stream on the switching side of the large number is set to st#j2, the unit stream is switched by using a fact that the phase of the unit stream st#j1 is advanced than the phase of the unit stream st#j2 by (j2–j1).

In case of FIG. 22, since j1=0 and j2=2, (j2–j1)=2 phases

The unit stream st#2 is allocated to the output stream #B just before the switching, the disk read DR1 is executed to the unit buffer at the first phase, and the external outputs AW1 to AW4 are executed from the same buffer at the remaining four phases.

Figures 23, 24, 25:
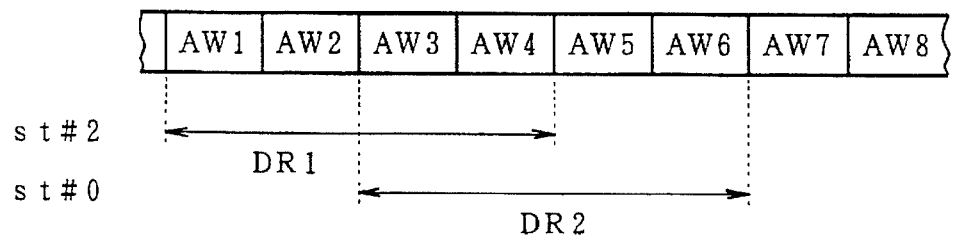
FIG. 23 is an explanatory diagram for access blocks of unit streams on a switching side just before the switching.
FIG. 24 is an explanatory diagram for the next access block on the switching side and access blocks on the switching destination side.
FIG. 25 is an explanatory diagram for disk tracks of a disk reading process at the time of switching of output unit streams.

FIG. 23 shows an access area of the output stream (request stream) (B) due to the allocation of the unit stream st#2 before switching. An offset (x~x+Δx) becomes an access block due to the disk read DR1 of one time. In FIG. 22, when switching from the unit stream st#2 to the unit stream st#0, the disk read DR2 of the unit stream st#0 on the switching destination side is executed at a timing that is away from the unit stream st#2 before the switching by a phase difference of (j2–j1)=2 phases between the unit streams st#2 and st#0. In consideration of the phase difference of (j2–j1), since the area to be read by the disk read DR2 lies within the following range {x+Δx–(j2–j1)Δx/N}
~{x+2Δx–(j2–j1)Δx/N}

Namely, (x+Δx/2)~(x+Δx/2+Δx)

FIG. 24 shows a general form of the area to be read out by the disk read DR2 of the unit stream st#0 on the switching destination side. First, an area to be read out by the next disk read in the case where the unit stream st#2 is continued as it is is (x+Δx)~(x+2Δx)

On the other hand, as for a block to be read out by the disk read DR2 of the unit stream st#0, an area which is returned by only (j2–j1)=2 phases (x+2Δx/4)~(x+6Δx/4)

is read out.

FIG. 25 shows an area of the streams as targets of the disk reads DR1 and DR2 in FIG. 22 and the units of the external outputs are shown by AW1, AW2, . . . First, in the disk read DR1 of the unit stream st#2 just before the switching, the data of four units shown by AW1 to AW4 is read. In the next disk read DR2 of the unit stream st#0 on the switching destination side, the data of four units of AW3 to AW6 is read. Therefore, two blocks of AW3 and AW4 are overlappingly read out. Referring again to FIG. 22, even if AW3 to AW6 are read by the disk read DR2 in the unit stream st#0 on the switching destination side, the switching is not performed at that time point. Therefore, the external outputs AW3 and AW4 from the allocation buffer of the unit stream st#2 are executed. When the external outputs of the unit stream st#2 are finished, the unit stream is switched to the unit stream st#0 at this time point. In this instance, since the AW3 to AW6 have already been stored in the allocation unit buffer of the unit stream st#0 by the disk read DR2, the buffer reading operation is started from AW5 at the time of the switching from the unit stream st#2 and the external outputs up to AW6 are executed. After that, the next disk read DR2 is executed with respect to the switched unit stream st#0 at the same phase as that of the external output AW6, so that the apparatus enters a supplying state of the output stream by the allocation of the unit stream st#0 on the switching destination side. Therefore, even when switching from the unit stream st#2 to the unit stream st#0, the external streams can be continuously supplied like AW1 to AW6.

Figures 26, 27:
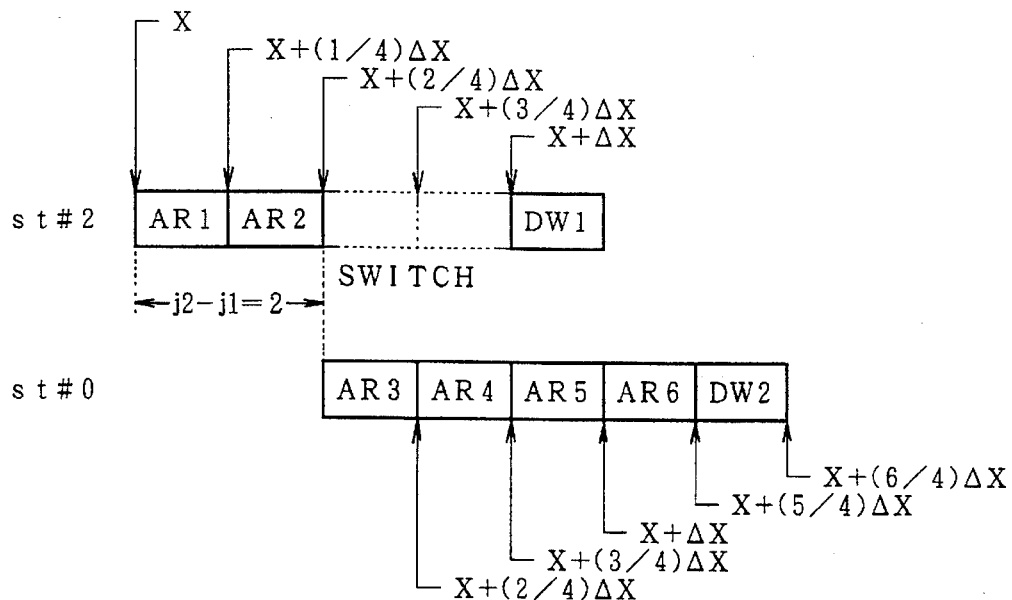
FIG. 26 is an explanatory diagram for switching of input unit streams.
FIG. 27 is an explanatory diagram for the next access block on the switching side and access blocks on the switching destination side.

FIG. 26 shows an allocation switching of the unit stream in the case where the request stream is an input stream. In a manner similar to the switching of the output stream of FIG. 22, in FIG. 26 as well, the unit stream on the switching side is set to st#2 and the unit stream on the switching destination side is set to st#0. Therefore, the phase difference between the unit streams st#2 and st#0 is the same value of two phases as that in case of the output stream. First, in the unit stream st#2 just before the switching, since the phase difference reaches "2" at the time point when there is a stream input of two blocks of the external inputs AR1 and AR2, the unit stream is switched to the unit stream st#0 on the switching destination side. The subsequent external input AR3 is stored into the unit buffer corresponding to the allocation of the unit stream st#0. After completion of the allocation switching to the unit stream st#0, the external inputs AR3 to AR6 are sequentially inputted. The phase of the external input AR5 is the phase of the disk write DW1 of the unit stream st#2 before the switching. By effectively executing the disk write DW1, the external inputs AR1 and AR2 of the unit stream st#2 before the switching are written to the disk. Subsequently, when the external input AR6 is finished in the unit stream st#0 on the switching destination side, the phase is set to the phase of the disk write DW2. The data of four blocks obtained as external inputs AR3 to AR6 is written to the disk side by the disk write DW2. In this instance, in addition to the data of AR1 and AR2, since the vacant data of two units has also been written by the disk write DW1 of the unit stream st#2 before switching, the overlap writing is executed with regard to AR3 and AR4 among the external inputs AR3 to AR6 by the disk write DW2 of the unit stream st#0 on the next switching destination side.

Thus, even if the unit stream is switched from st#2 to st#0, the write data on the disk track becomes the data of the continuous external inputs AR1 to AR6.

FIG. 27 shows an input area $x\sim x+\Delta x$ of the unit stream st#2 on the switching side in the switching of the allocation unit stream of the input stream in FIG. 26 and an input area $$\{x+\Delta x-(j2-j1)\Delta x/N\}$$
$$\sim\{x+2\Delta x-(j2-j1)\Delta x/N\}$$

after the switching in the unit stream st#0 on the switching destination side.

Figure 28:
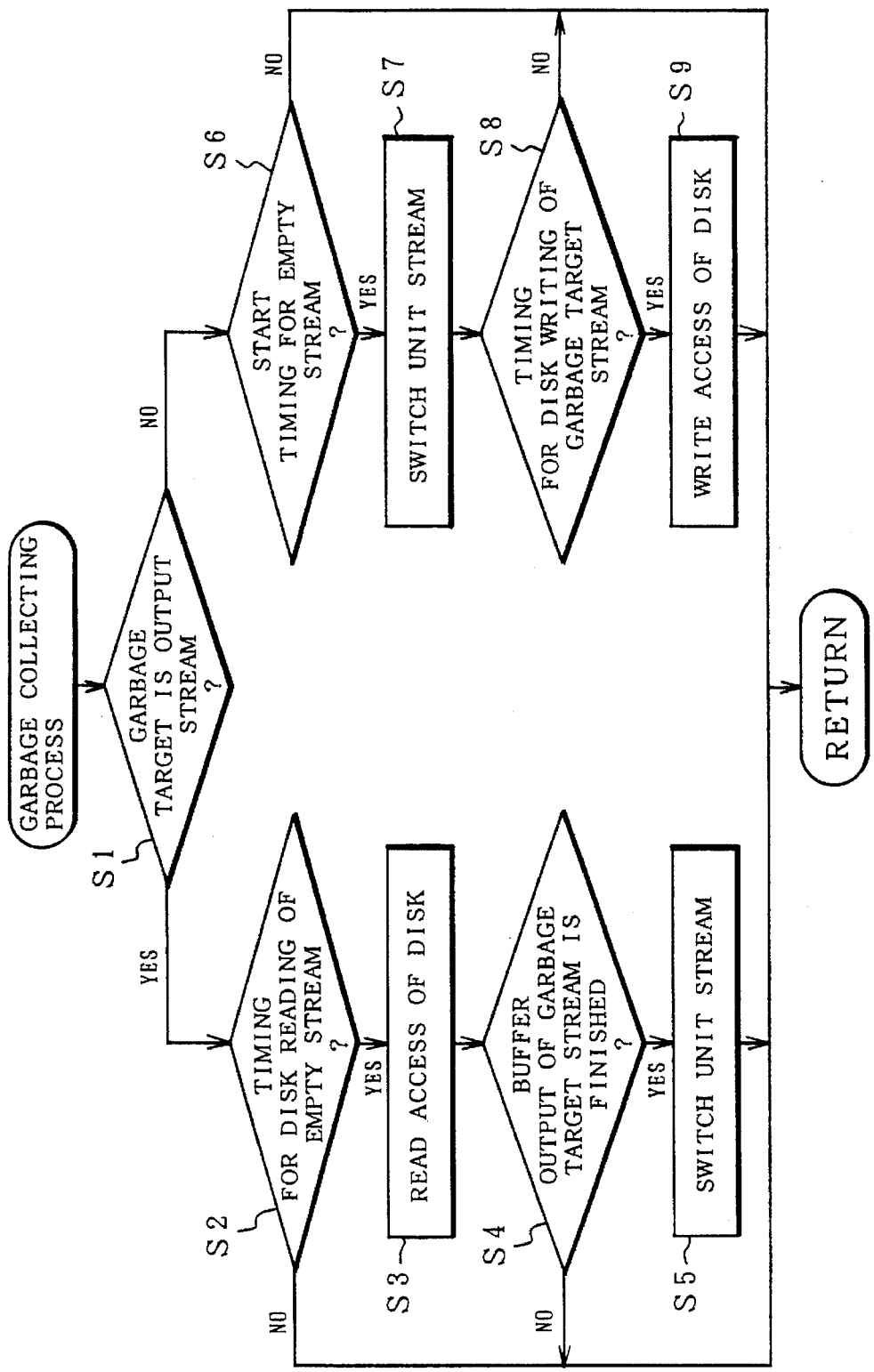
FIG. 28 is a flowchart for a garbage collecting process.

A flowchart of FIG. 28 shows the garbage collecting process of the invention. First in step S1, a check is made to see if the garbage target is the output stream or not. If YES, step S2 follows and a check is made to see if the timing is a timing for the disk read of the vacant stream on the switching destination side based on the phase difference between the unit stream on the switching side and the unit stream on the switching destination side or not. When it is the timing for the disk read, the disk reading operation is executed in step S3 and the read-out data is stored into the corresponding unit buffer. In step S4, a check is made to see if the buffer output of the garbage target stream (unit stream on the switching side) has been finished or not. If YES, the unit output stream is switched in step S5. On the other hand, when the garbage target is the input stream, step S6 follows and a check is similarly made to see if the timing is a start timing of the vacant stream on the switching destination side or not. When it is the start timing, the unit stream is switched in step S7. In step S8, a check is made to see if the timing is a timing for disk write of the garbage target stream (unit stream on the switching side) or not. When it is the timing for disk write, a write access to write each block of the input stream stored in the unit buffer before switching to the disk is executed in step S9.

[Other operation environments]

Figure 29:
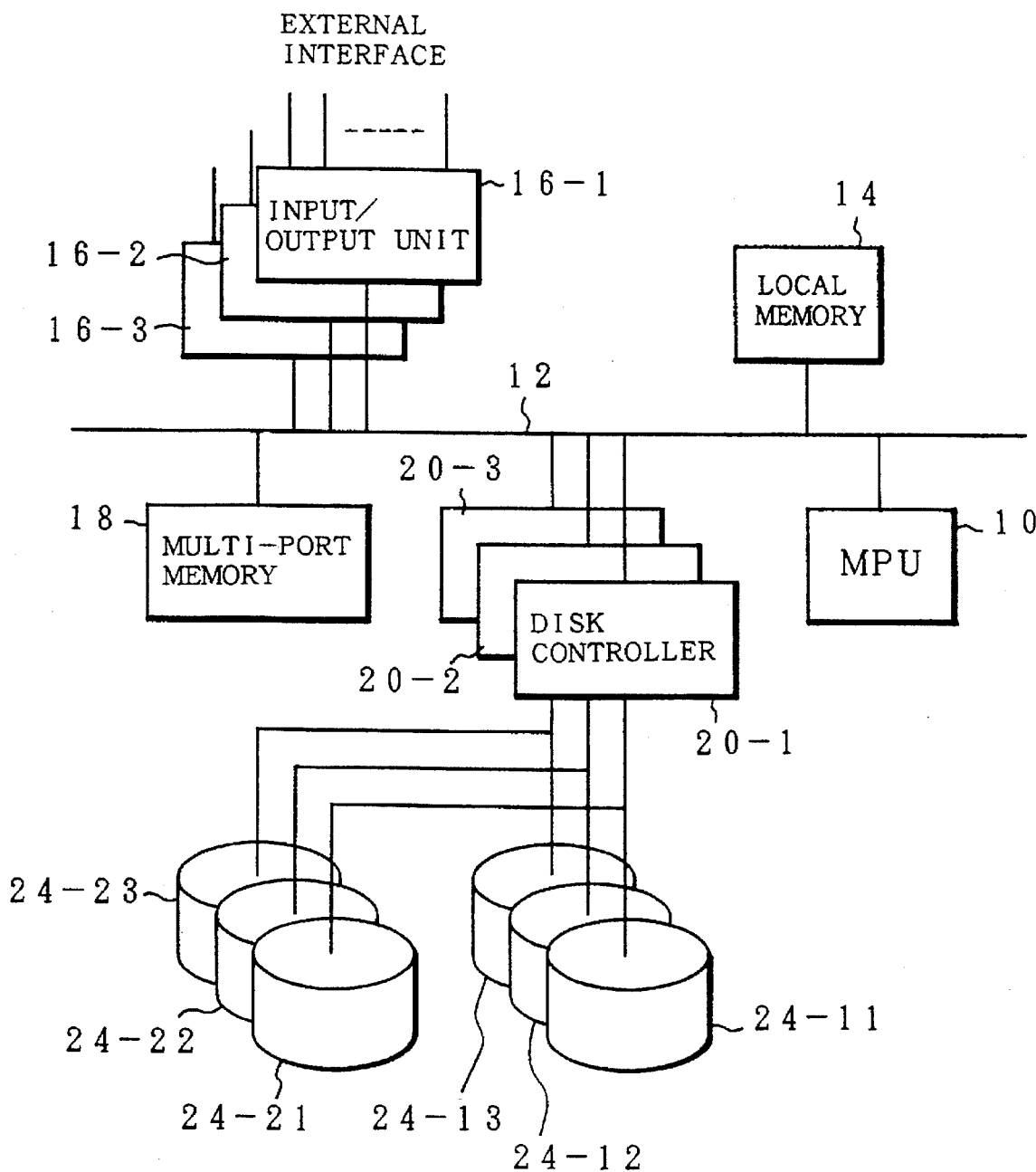
FIG. 29 is a block diagram of another embodiment of an operation environment of the invention.

FIG. 29 shows another embodiment of an operation environment of the stream processing apparatus of the invention. The embodiment is characterized in that three input/output units 16-1 to 16-3 are provided as external I/O units and, further, with respect to the memory unit as well, three disk controllers 20-1 to 20-3 and every two magnetic disk drive units (24-11, 24-21), (24-12, 24-22), and (24-13, 24-23) for each of the three disk controllers 20-1 to 20-3 are provided. Functionally, the above construction is equivalent to that three input/output functions of the streams according to the embodiment of FIG. 1 are provided.

Figure 30:
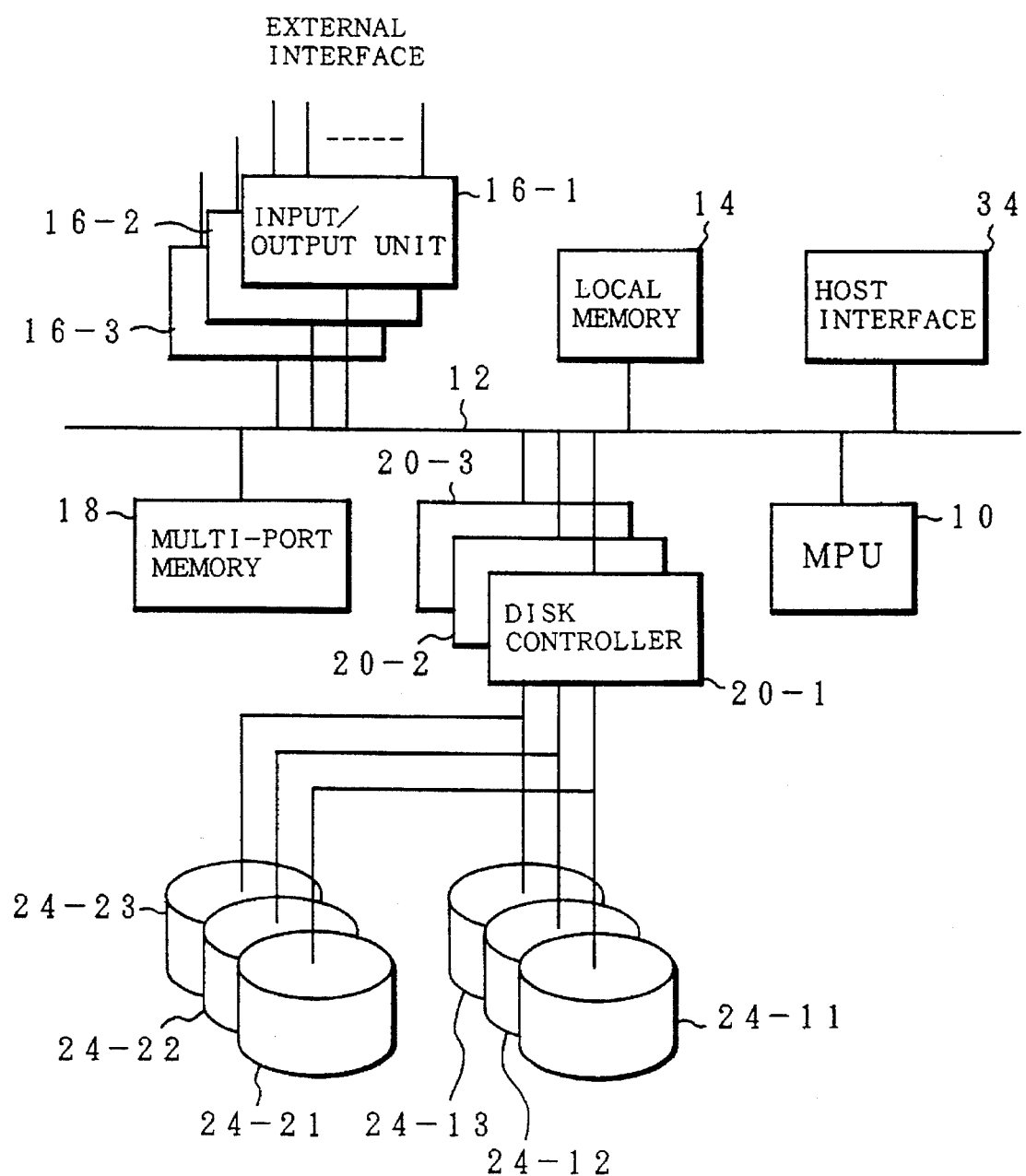
FIG. 30 is a block diagram of another embodiment of an operation environment of the invention.

FIG. 30 shows another embodiment of an operation environment of the stream processing apparatus of the invention. The embodiment is characterized in that a host interface 34 is further added to the embodiment of FIG. 29, thereby enabling the stream input/output processes based on commands from a host computer to be managed.

According to the invention as described above, since the input/output request of the stream is processed by using the prepared schedule, it doesn't take a long time for scheduling when the request is received and the apparatus can process at a high speed.

Since the schedule is formed with respect to all of the unit streams which can be allocated, the resources constructed by the external input/output unit, memory unit, and buffer memory are not used in vain. The streams can be supplied by using the necessary maximum number of unit streams in accordance with the input/output request of the stream.

Further, since the maximum number of unit streams which can be simultaneously supplied and the number of unit streams which are at present being supplied can be easily managed, when there is an input/output request of a new stream, if there is no vacant unit stream according to the request speed, the busy response can be immediately returned.

Further, since the using state of the unit stream can be easily known, the maximum number of unit streams which can be simultaneously supplied from the outside and the number of unit streams which are at present being supplied can be managed. A situation such that if the unit stream in the vacant state according to the self request speed doesn't exist, even if an input/output request of the stream is generated, a busy response is returned can be preliminarily known. There is no need to generate a request such as to cause a busy response from the beginning. Consequently, the input/output request of the stream by the external user can be efficiently performed.

The above embodiment has been shown and described with respect to the case, as an example, where by setting the accessing speed on the disk side to a speed that is four times as high as the reference speed, the allocation schedule of four unit streams st#0 to st#3 is formed and the input/output process is executed. However, by properly setting the speed ratio between the reference speed and the accessing speed, it is also possible to form the allocation schedule using an arbitrary number of unit streams and to execute the input/output processes of the stream. The present invention is not limited by the numerical values shown in the above embodiments.

What is claimed is:

1. An apparatus for processing an input/output of a data stream, comprising:

an external input/output unit for receiving a plurality of input/output requests of a data stream for an outside and for executing a transmission or reception of the requested data stream in parallel at a predetermined reference speed or a speed that is predetermined number of times as high as said reference speed;

a memory unit for storing the data stream and for executing a reading or writing operation of the data stream on a block unit basis of a predetermined data length at an accessing speed which is (N) times as high as said reference speed;

a buffer memory, provided between said external input/output unit and said memory unit, for temporarily storing the data stream on said block unit basis;

a schedule forming unit for forming a schedule to determine a plurality of unit data streams which can be simultaneously supplied at said reference speed and to allocate time-dependent uses of said memory unit, said input/output unit, and said buffer memory for all of the unit data streams; and a data stream allocation unit for allocating a necessary number of un-used said unit data streams in accordance with a request speed when there is the input/output request of the data stream and for supplying the request data stream in accordance with the schedule of the allocated unit data streams.

2. An apparatus according to claim 1, wherein said schedule forming unit forms said schedule with respect to the (N) unit data streams which are determined by a speed ratio obtained by dividing the accessing speed of said memory unit by said reference speed.

3. An apparatus according to claim 2, wherein said buffer memory divides a buffer area into (N+1) unit buffers Bi (i=0 to N) in which "1" is added to the number (N) of said unit data streams, each of said unit buffers is an area of said one block which is transferred by an access of one time of said memory unit, and in the case where a repetitive period (T) that is defined by a period N(N+1) is divided into phases p=0 to (T−1) and said unit buffer number is set to (i) and said unit stream number is set to (j), said schedule forming unit forms a schedule to which a data stream number (j) obtained by $$j=\{(p+i)div(N+1)-i\}mod N$$

is allocated.

4. An apparatus according to claim 2, wherein said buffer memory divides the buffer area into (N+1) unit buffers Bi (i=0~N) in which "1" is added to said number (N) of unit data streams, each of said unit buffers is an area of said one block that is transferred by an access of one time of said memory unit, and in the case where a repetitive period (T) which is defined by a period N(N+1) is divided into phases p=0~(T−1) and said unit buffer number is set to (i) and said unit data stream number is set to (j), said schedule forming unit forms a schedule in which when said phase (p) is set to, the unit buffers of two buffer numbers i1 and i2 obtained by $$i1=\{(p-j)div\ N-j\}mod(N+1)$$

$$i2=(i1-1)mod(N+1)$$

are allocated to the unit data stream of the data stream number (j), and when said phase (p) is set to, the unit buffer of the buffer number i1 obtained by $$i1=\{(p-j)div\ N-j\}mod(N+1)$$

is allocated to the unit data stream of the data stream number (j).

5. An apparatus according to claim 1, wherein when there is an input/output request of the data stream in which the request speed is designated, said data stream allocation unit allocates the un-used unit data streams of the number according to said request speed to an input/output of said request data stream.

6. An apparatus according to claim 5, wherein said request speed of the data stream from said outside is a speed in a range from said reference speed to the speed of (N) times of said reference speed, and said data stream allocation unit allocates the un-used unit data streams of the number which coincides with a speed ratio (K=1~N) obtained by dividing said request speed by said reference speed to the input/output of said request data stream.

7. An apparatus according to claim 6, wherein in the case where said speed ratio (K) includes a decimal, said data stream allocation unit allocates the un-used unit data streams of the number which coincides with a speed ratio obtained by raising said decimal to an integer to the input/output of said request data stream.

8. An apparatus according to claim 1, wherein in the case where the request data stream from said outside is an output data stream, said data stream allocation unit switches said unit buffer every (N+1) phases in accordance with the schedule of the allocated unit data streams, reads out the data stream of one block from said memory unit and stores into said unit buffer at the head phase after completion of said buffer switching, and reads out said data stream from said unit buffer for the remaining (N) phases and transmits to said outside.

9. An apparatus according to claim 8, wherein in the case where the request speed of said output data stream is the reference speed, said data stream allocation unit reads out the data stream of one block from said memory unit and stores into said unit buffer at the head phase after completion of the buffer switching according to the schedule of the allocated unit data streams, and sequentially reads out the data stream on a (1/N) block unit basis from said unit buffer at each of the remaining (N) phases and transmits to said outside.

10. An apparatus according to claim 8, wherein in the case where the request speed of said output data stream is higher than the reference speed, said data stream allocation unit reads out the data stream of one block from said memory unit and stores in said unit buffer at the head phase after completion of the buffer switching according to the schedule of each of the unit data streams allocated in accordance with a speed ratio (K), and sequentially reads out the data stream on a (K/N) block unit basis from said unit buffer and transmits to said outside at each of the next (N/K) phases.

11. An apparatus according to claim 1, wherein in the case where said request data stream is an input data stream, said data stream allocation unit switches the allocation of said unit buffers of the request data stream every (N+1) phases in accordance with the schedule of the allocated unit data streams, stores the data stream received from said outside into said unit buffer for the (N) phases after completion of said buffer switching, reads out the data stream of one block from said unit buffer and writes into said memory unit at the final phase.

12. An apparatus according to claim 11, wherein in the case where the request speed of said input data stream is the reference speed, said data stream allocation unit sequentially stores the data stream received from said outside on a (1/N) block unit basis into said unit buffer at each of the (N) phases after completion of the buffer switching according to the schedule of the allocated unit data streams, and reads out the data stream of one block from said unit buffer and writes into said memory unit at the final phase.

13. An apparatus according to claim 11, wherein in the case where the request speed of said input data stream is higher than the reference speed, said data stream allocation unit sequentially stores the data stream received on a (K/N) block unit basis from the outside into said unit buffer at each of the (N/K) phases after completion of the buffer switching according to the schedule of each of the unit data streams allocated in accordance with the speed ratio (K), and reads out the data stream of one block from said unit buffer and writes into said memory unit at the final phase.

14. An apparatus according to claim 1, wherein in the case where the supply of said request data stream is finished, said data stream allocation unit collects the allocated unit data streams and sets to vacant data streams.

15. An apparatus according to claim 1, wherein when the input/output request of the data stream is received, said data stream allocation unit allocates the unit data stream of the smallest data stream number (j) among the un-used unit data streams.

16. An apparatus according to claim 15, wherein in the case where the unit data streams are collected and the vacant data stream of the number smaller than the unit data streams which are being allocated occurs, said data stream allocation unit changes the unit data streams which are being allocated to the vacant unit data streams of the small number.

17. A data stream processing method of an apparatus comprising:

an external input/output unit for receiving a plurality of input/output requests of a data stream for an outside and executing a transmission or reception of the requested data stream in parallel at a predetermined reference speed or a speed that is a predetermined number of times as high as said reference speed, a memory unit for storing the data stream and for executing a reading or writing operation of the data stream on a block unit basis of a predetermined data length at an accessing speed of (N) times of said reference speed, and a buffer memory, provided between said external input/output unit and said memory unit, for temporarily storing the data stream on said block unit basis, wherein said method comprising the steps of:

forming a schedule for deciding a plurality of unit data streams which can be simultaneously supplied at the reference speed and for allocating time-dependent uses of said memory unit, said input/output unit, and said buffer memory to all of unit data streams; and allocating a necessary number of un-used unit data streams in accordance with the request speed when there is the input/output request of the data stream and supplying the request data stream in accordance with the schedule of the allocated unit data streams.

18. A method according to claim 17, wherein said schedule is formed with respect to the unit data streams of the number which is determined by the speed ratio (N) obtained by dividing said accessing speed by said reference speed.

19. A method according to claim 18, wherein in said buffer memory, a buffer area is divided into (N+1) unit buffers Bi (i=0~N) in which "1" is added to the number (N) of said unit data streams, each of said unit buffers is an area of said one block which is transferred by an access of one time of said memory unit, and in the case where a repetitive period (T) which is defined by a period N(N+1) is divided into phases and said unit buffer number is set to (i) and said unit data stream number is set to (j), said schedule forming unit forms the schedule to which the data stream number (j) obtained by $$j=\{(p+i)div(N+1)-i\}modN$$

is allocated.

20. A method according to claim 17, wherein in said buffer memory, a buffer area is divided into (N+1) unit buffers Bi (i=0~N) in which "1" is added to the number (N) of said unit data streams, each of said unit buffers is an area of said one block which is transferred by an access of one time of said memory unit, in the case where a repetitive period (T) which is defined by N(N+1) is divided into phases and the number of said unit buffer is set to (i) and the number of said unit data stream is set to (j), in the forming of said schedule, when said phase (p) is set to, the unit buffers of two buffer numbers i1 and i2 obtained by $$i1=\{(p-j)div\ N-j\}mod(N+1)$$

$$i2=(i1-1)mod(N+1)$$

are allocated to the unit data stream of the data stream number (j), and when said phase (p) is set to, the unit buffer of the buffer number i1 obtained by $$i1=\{(p-j)div\ N-j\}mod(N+1)$$

is allocated to the unit data stream of the data stream number (j).

21. A method according to claim 17, wherein when there is the input/output request of the data stream in which the request speed is designated, the un-used unit data streams of the number according to said request speed are allocated to an input/output of the request data stream.

22. A method according to claim 21, wherein said request speed of said data stream is a speed in a range from said reference speed to a speed of (N) times of said reference speed, and the un-used unit data streams of the number which coincides with a speed ratio (K=1~N) obtained by dividing said request speed by said reference speed are allocated to the input/output of said request data stream.

23. A method according to claim 22, wherein in the case where said speed ratio (K) includes a decimal, the un-used unit data streams of the number which coincides with a speed ratio obtained by raising said decimal to an integer are allocated to the input/output of said request data stream.

24. A method according to claim 17, wherein in the case where said request data stream is an output data stream, said unit buffer of said request data stream is switched every (N+1) phases in accordance with the schedule of said allocated unit data streams, the data stream of one block from said memory unit is read out and stored into said unit buffer at the head phase after completion of said buffer switching, and said data stream is read out from said unit buffer and transmitted to said outside for the remaining (N) phases.

25. A method according to claim 24, wherein in the case where the request speed of said output data stream is the reference speed, the data stream of one block from said memory unit is read out and stored in said unit buffer at the head phase after completion of said buffer switching according to the schedule of the allocated unit data streams, and the data stream is sequentially read out from said unit buffer on a (1/N) block unit basis and is transmitted to said outside at each of the remaining (N) phases.

26. A method according to claim 24, wherein in the case where the request speed of said output data stream is higher than said reference speed, the data stream of one block from said memory unit is read out and stored in said unit buffer at the head phase after completion of said buffer switching according to the schedule of each of the unit data streams allocated in accordance with a speed ratio (K), and the data stream is sequentially read out from said unit buffer on a (K/N) block unit basis and is transmitted to said outside at each of the next (N/K) phases.

27. A method according to claim 17, wherein in the case where said request data stream is an input data stream, the allocation of said unit buffer is switched every (N+1) phases in accordance with the schedule of the allocated unit data stream, the data stream received from said outside is stored in said unit buffer for (N) phases after completion of said buffer switching, and the data stream of one block is read out from said unit buffer and is written into said memory unit at the final phase.

28. A method according to claim 27, wherein in the case where the request speed of said input data stream is the reference speed, the data stream received on a (1/N) block unit basis from said outside is sequentially stored in said unit buffer at each of the (N) phases after completion of said buffer switching according to the schedule of the allocated unit data streams, and the data stream of one block is read out from said unit buffer and written in said memory unit at the final phase.

29. A method according to claim 27, wherein in the case where the request speed of said input data stream is higher than said reference speed, the data stream received on a (K/N) block unit basis from said outside is sequentially stored in said unit buffer at each of the (N/K) phases after completion of said unit buffer switching according to the schedule of each of said unit data streams allocated in accordance with a speed ratio (K), and the data stream of one block is read out from said unit buffer and is written into said memory unit at the final phase.

30. A method according to claim 17, wherein in the case where the input or output of said request data stream is finished, the allocated unit data streams are collected and set to vacant data streams.

31. A method according to claim 17, wherein when the input/output request of said data stream is received, the unit data stream of the smallest data stream number (j) among the un-used unit data streams is allocated.

32. A method according to claim 31, wherein in the case where the unit data streams are collected and the vacant data streams of the number smaller than that of the unit data streams which are being allocated occur, the unit data streams which are being allocated are changed to the vacant unit data streams of the small number.

33. A data stream processing method comprising the steps of:
receiving a plurality of input/output requests of a data stream for an outside by an external input/output unit;
executing a transmission or reception of the requested data stream in parallel at a predetermined reference speed or a speed that is a predetermined number of times as high as said reference speed by said external input/output unit;
storing the data stream into a memory unit;
executing a reading or writing operation of the data stream in the memory unit on a block unit basis of a predetermined data length at an accessing speed of (N) times of said reference speed, and
temporarily storing the data stream on said block unit basis in a buffer memory, provided between said external input/output unit and said memory unit;
forming a schedule for deciding a plurality of unit data streams which can be simultaneously supplied at the reference speed and for allocating time-dependent uses of said memory unit, said input/output unit, and said buffer memory to all of unit data streams; and
allocating a necessary number of un-used unit data streams in accordance with the request speed when there is the input/output request of the data stream and supplying the request data stream in accordance with the schedule of the allocated unit data streams.

34. A method according to claim 33, wherein said schedule is formed with respect to the unit data streams of the number which is determined by the speed ratio (N) obtained by dividing said accessing speed by said reference speed.

35. A method according to claim 34, wherein
in said buffer memory, a buffer area is divided into (N+1) unit buffers Bi (i=0~N) in which "1" is added to the number (N) of said unit data streams, each of said unit buffers is an area of said one block which is transferred by an access of one time of said memory unit, and
in the case where a repetitive period (T) which is defined by a period N(N+1) is divided into phases and said unit buffer number is set to (i) and said unit data stream number is set to (j), said schedule forming unit forms the schedule to which the data stream number (j) obtained by $$j=\{(p+i)div(N+1)-i\}mod N$$

is allocated.

36. A method according to claim 33, wherein
in said buffer memory, a buffer area is divided into (N+1) unit buffers Bi (i=0~N) in which "1" is added to the number (N) of said unit data streams, each of said unit buffers is an area of said one block which is transferred by an access of one time of said memory unit,
in the case where a repetitive period (T) which is defined by N(N+1) is divided into phases and the number of said unit buffer is set to (i) and the number of said unit data stream is set to (j), in the forming of said schedule,
when said phase (p) is set to,
the unit buffers of two buffer numbers i1 and i2 obtained by $$i1=\{(p-j)div\ N-j\}mod(N+1)$$
$$i2=(i1-1)mod(N+1)$$

are allocated to the unit data stream of the data stream number (j), and
when said phase (p) is set to,
the unit buffer of the buffer number i1 obtained by $$i1=\{(p-j)div\ N-j\}mod(N+1)$$

is allocated to the unit data stream of the data stream number (j).

37. A method according to claim 33, wherein when there is the input/output request of the data stream in which the request speed is designated, the un-used unit data streams of the number according to said request speed are allocated to an input/output of the request data stream.

38. A method according to claim 37, wherein
said request speed of said data stream is a speed in a range from said reference speed to a speed of (N) times of said reference speed, and
the un-used unit data streams of the number which coincides with a speed ratio (K=1~N) obtained by dividing said request speed by said reference speed are allocated to the input/output of said request data stream.

39. A method according to claim 38, wherein in the case where said speed ratio (K) includes a decimal, the un-used unit data streams of the number which coincides with a speed ratio obtained by raising said decimal to an integer are allocated to the input/output of said request data stream.

40. A method according to claim 33, wherein in the case where said request data stream is an output data stream, said unit buffer of said request data stream is switched every (N+1) phases in accordance with the schedule of said allocated unit data streams, the data stream of one block from said memory unit is read out and stored into said unit buffer at the head phase after completion of said buffer switching, and said data stream is read out from said unit buffer and transmitted to said outside for the remaining (N) phases.

41. A method according to claim 40, wherein in the case where the request speed of said output data stream is the reference speed, the data stream of one block from said memory unit is read out and stored in said unit buffer at the head phase after completion of said buffer switching according to the schedule of the allocated unit data streams, and the data stream is sequentially read out from said unit buffer on a (1/N) block unit basis and is transmitted to said outside at each of the remaining (N) phases.

42. A method according to claim 40, wherein in the case where the request speed of said output data stream is higher than said reference speed, the data stream of one block from said memory unit is read out and stored in said unit buffer at the head phase after completion of said buffer switching according to the schedule of each of the unit data streams allocated in accordance with a speed ratio (K), and the data stream is sequentially read out from said unit buffer on a (K/N) block unit basis and is transmitted to said outside at each of the next (N/K) phases.

43. A method according to claim 33, wherein in the case where said request data stream is an input data stream, the allocation of said unit buffer is switched every (N+1) phases in accordance with the schedule of the allocated unit data stream, the data stream received from said outside is stored in said unit buffer for (N) phases after completion of said buffer switching, and the data stream of one block is read out from said unit buffer and is written into said memory unit at the final phase.

44. A method according to claim 43, wherein in the case where the request speed of said input data stream is the reference speed, the data stream received on a (1/N) block unit basis from said outside is sequentially stored in said unit buffer at each of the (N) phases after completion of said buffer switching according to the schedule of the allocated unit data streams, and the data stream of one block is read out from said unit buffer and written in said memory unit at the final phase.

45. A method according to claim 43, wherein in the case where the request speed of said input data stream is higher than said reference speed, the data stream received on a (K/N) block unit basis from said outside is sequentially stored in said unit buffer at each of the (N/K) phases after completion of said unit buffer switching according to the schedule of each of said unit data streams allocated in accordance with a speed ratio (K), and the data stream of one block is read out from said unit buffer and is written into said memory unit at the final phase.

46. A method according to claim 33, wherein in the case where the input or output of said request data stream is finished, the allocated unit data streams are collected and set to vacant data streams.

47. A method according to claim 33, wherein when the input/output request of said data stream is received, the unit data stream of the smallest data stream number (j) among the un-used unit data streams is allocated.

48. A method according to claim 47, wherein in the case where the unit data streams are collected and the vacant data streams of the number smaller than that of the unit data streams which are being allocated occur, the unit data streams which are being allocated are changed to the vacant unit data streams of the small number.

* * * * *